(12) United States Patent
Di Pietro et al.

(10) Patent No.: US 9,521,158 B2
(45) Date of Patent: Dec. 13, 2016

(54) FEATURE AGGREGATION IN A COMPUTER NETWORK

(71) Applicant: Cisco Technology, Inc., San Jose, CA (US)

(72) Inventors: Andrea Di Pietro, Lausanne (CH); Jean-Philippe Vasseur, Saint Martin d'Uriage (FR); Javier Cruz Mota, Assens (CH)

(73) Assignee: Cisco Technology, Inc., San Jose, CA (US)

( * ) Notice: Subject to any disclaimer, the term of this patent is extended or adjusted under 35 U.S.C. 154(b) by 203 days.

(21) Appl. No.: 14/164,480

(22) Filed: Jan. 27, 2014

(65) Prior Publication Data

US 2015/0195146 A1 Jul. 9, 2015

Related U.S. Application Data

(60) Provisional application No. 61/923,847, filed on Jan. 6, 2014.

(51) Int. Cl.
| | |
|---|---|
| *H04L 29/06* | (2006.01) |
| *G06N 99/00* | (2010.01) |
| *H04L 12/26* | (2006.01) |
| *G06N 3/02* | (2006.01) |
| *H04L 12/24* | (2006.01) |

(Continued)

(52) U.S. Cl.
CPC ............ *H04L 63/1425* (2013.01); *G06N 3/02* (2013.01); *G06N 99/005* (2013.01); *H04L 41/16* (2013.01); *H04L 43/0876* (2013.01); *H04L 47/127* (2013.01); *H04L 47/2466* (2013.01); *H04L 47/41* (2013.01); *G06N 3/08* (2013.01); *G06N 3/084* (2013.01); *H04L 45/48* (2013.01)

(58) Field of Classification Search
None
See application file for complete search history.

(56) References Cited

U.S. PATENT DOCUMENTS

| 7,526,806 B2 | 4/2009 | Wiley et al. |
|---|---|---|
| 7,603,709 B2 | 10/2009 | Lewis et al. |

(Continued)

FOREIGN PATENT DOCUMENTS

| EP | 2442525 A1 | 4/2012 |
|---|---|---|
| WO | WO-02/48959 A2 | 6/2002 |

OTHER PUBLICATIONS

Cai, et al., "Distributed Aggregation Algorithms with Load-Balancing for Scalable Grid Resource Monitoring", Parallel and Distributed Processing Symposium, Mar. 2007, 10 pages, Institute of Electical and Electronics Engineers.

(Continued)

*Primary Examiner* — Kodzovi Acolatse
(74) *Attorney, Agent, or Firm* — Parker Ibrahim & Berg LLC; James M. Behmke; Stephen D. LeBarron

(57) ABSTRACT

In one embodiment, a device determines that input data to a machine learning model sent from a plurality of source nodes to an aggregation node is causing network congestion. A set of one or more other nodes to perform aggregation of the machine learning model input data is selected. A type of aggregation to be performed by the set of one or more other nodes is also selected. The set of one or more other nodes is also instructed to perform the selected type of aggregation on the data sent from the source nodes.

20 Claims, 44 Drawing Sheets

(51) Int. Cl.
*H04L 12/801* (2013.01)
*H04L 12/855* (2013.01)
*H04L 12/891* (2013.01)
*G06N 3/08* (2006.01)
*H04L 12/753* (2013.01)

(56) References Cited

U.S. PATENT DOCUMENTS

| | | |
|---|---|---|
| 7,657,940 B2 | 2/2010 | Portolani et al. |
| 7,675,926 B2 | 3/2010 | Olsen et al. |
| 7,694,335 B1 | 4/2010 | Turner et al. |
| 7,733,798 B2 | 6/2010 | White et al. |
| 7,779,471 B2 | 8/2010 | Balasubramaniyan et al. |
| 7,793,138 B2 | 9/2010 | Rastogi et al. |
| 7,854,000 B2 | 12/2010 | Venkat et al. |
| 7,971,256 B2 | 6/2011 | Bhikkaji et al. |
| 8,032,779 B2 | 10/2011 | Clemm et al. |
| 8,121,024 B1 | 2/2012 | Natarajan et al. |
| 8,161,554 B2 | 4/2012 | Sadhasivam et al. |
| 8,230,498 B2 | 7/2012 | Shaffer et al. |
| 8,261,355 B2 | 9/2012 | Rayes et al. |
| 8,312,541 B2 | 11/2012 | Levy-Abegnoli et al. |
| 8,619,576 B2 | 12/2013 | Vasseur et al. |
| 8,634,316 B2 | 1/2014 | Rosenberg et al. |
| 2003/0165137 A1* | 9/2003 | Soloway ............... H04L 45/00 370/389 |
| 2005/0027948 A1* | 2/2005 | Marlan ............ H04W 72/0406 711/150 |
| 2008/0083029 A1 | 4/2008 | Yeh et al. |
| 2008/0148342 A1 | 6/2008 | Aiyagari et al. |
| 2011/0214157 A1* | 9/2011 | Korsunsky ............ G06F 21/55 726/1 |
| 2011/0258702 A1 | 10/2011 | Olney et al. |
| 2012/0023572 A1 | 1/2012 | Williams, Jr. et al. |
| 2012/0026938 A1 | 2/2012 | Pandey et al. |
| 2012/0155475 A1 | 6/2012 | Vasseur et al. |
| 2012/0230204 A1* | 9/2012 | Vasseur ................. H04W 40/22 370/242 |
| 2012/0320923 A1 | 12/2012 | Vasseur et al. |
| 2013/0010610 A1 | 1/2013 | Karthikeyan et al. |
| 2013/0024560 A1 | 1/2013 | Vasseur et al. |
| 2013/0104230 A1* | 4/2013 | Tang .................... G06F 21/552 726/23 |
| 2013/0159479 A1 | 6/2013 | Vasseur |
| 2013/0159548 A1 | 6/2013 | Vasseur et al. |
| 2013/0179538 A1 | 7/2013 | Dutta et al. |
| 2013/0219046 A1 | 8/2013 | Wetterwald et al. |
| 2013/0276114 A1 | 10/2013 | Friedrichs et al. |
| 2013/0298184 A1 | 11/2013 | Ermagan et al. |
| 2014/0022906 A1 | 1/2014 | Vasseur et al. |
| 2014/0025945 A1 | 1/2014 | McGrew et al. |

OTHER PUBLICATIONS

Hwang, et al., "DHT-Based Security Infrastructure for Trusted Internet and Grid Computing", International Journal of Critical Infrastructures, vol. 2, No. 4, Nov. 2009, pp. 412-433, Inderscience Publishers.

Jover, R.P., "Security Attacks Against the Availability of LTE Mobility Networks: Overview and Research Directions", 16th International Symposium on Wireless Personal Multimedia Communications (WPMC), Jun. 2013, 9 pages, Atlantic City, NJ.

Lippmann, et al., "Analysis and Results of the 1999 DARPA Off-Line Intrusion Detection Evaluation", Proceedings of the Third International Workshop on Recent Advances in Intrusion Detection, RAID, (2000), pp. 162-182, Springer-Verlag, London, UK.

Oh, et al., "Distributed Learning in Mobile Sensor Networks Using Cross Validation" 49th IEEE Conference on Decision and Control, Dec. 2010, 6 pages, Institute of Electrical and Electronics Engineers, Atlanta, GA.

Ryan, et al., "Intrusion Detection with Neural Networks", Technical Report WS-97-07, (1997), pp. 72-77, Association for the Advancement of Artificial Intelligence.

Sommer, R., "Outside the Closed World: On Using Machine Learning for Network Intrusion Detection", IEEE Symposium on Security and Privacy, May 2010, pp. 305-316, Intitute of Electrical and Electronics Engineers, Oakland, CA.

Vasseur et al., "Computer Network Anomaly Training and Detection Using Artificial Neural Networks", U.S. Appl. No. 61/923,847, filed Jan. 6, 2014, 166 pgs., U.S. Patent and Trademark Office, Alexandria, Virginia.

Vasseur, et al., "Routing Metrics Used for Path Calculation in Low-Power and Lossy Networks", Request for Comments 6551, Mar. 2012, 30 pages, Internet Engineering Task Force Trust.

Viola, et al. "Rapid Object Detection Using a Boosted Cascade of Simple Features", Proceedings of the 2001 IEEE Computer Vision and Pattern Recognition, vol. 1, (2001), 8 pages, Institute of Electical and Electronics Engineers.

Winter, et al., "RPL: IPv6 Routing Protocol for Low-Power and Lossy Networks", Request for Comments 6550, Mar. 2012, 157 pages, Internet Engineering Task Force Trust.

Zinkevic, et al., "Parallelized Stochastic Gradient Descent", Proceedings of the Advances in Neural Information Processing Systems 23 (2010), 37 pages.

* cited by examiner

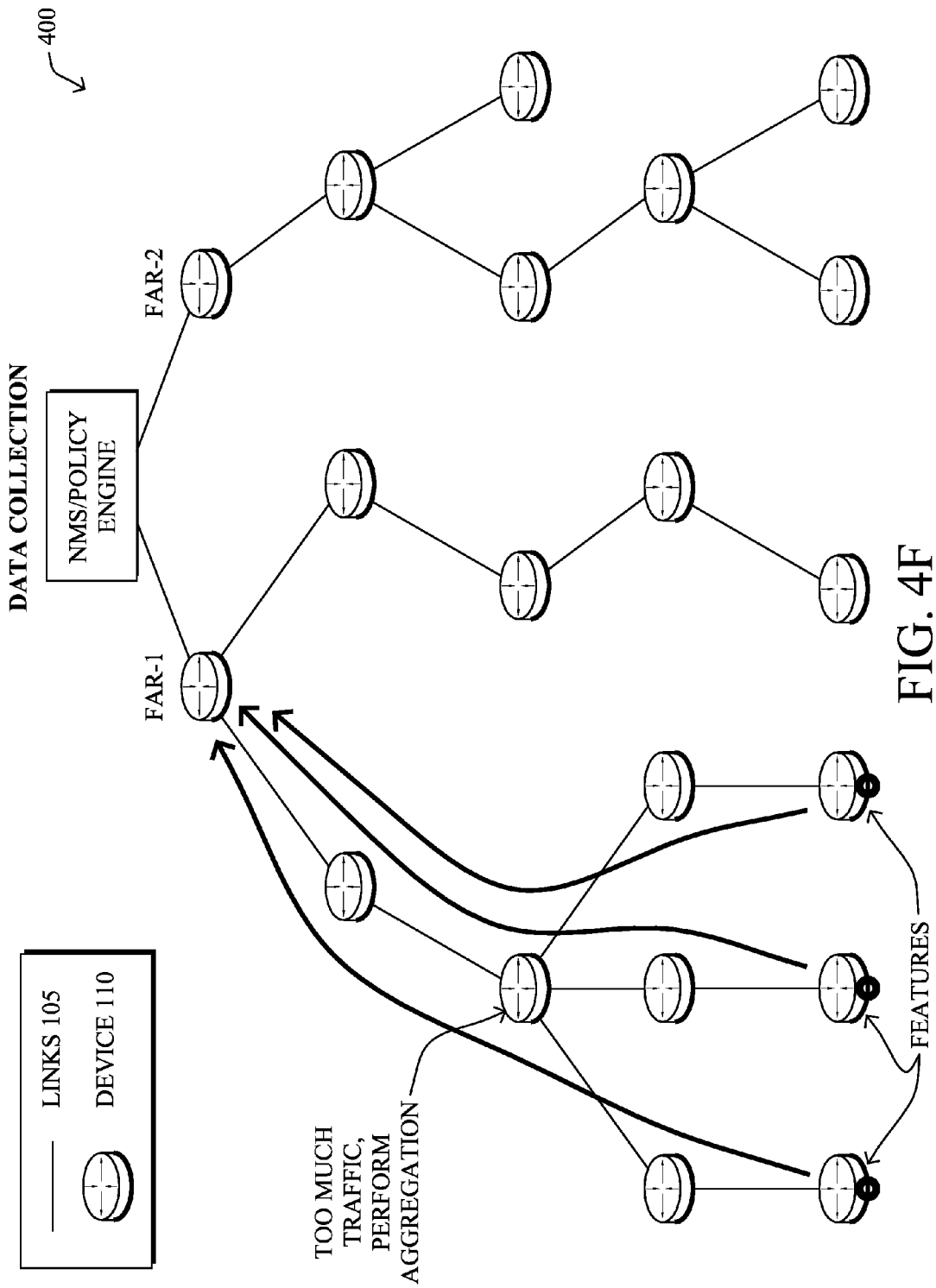

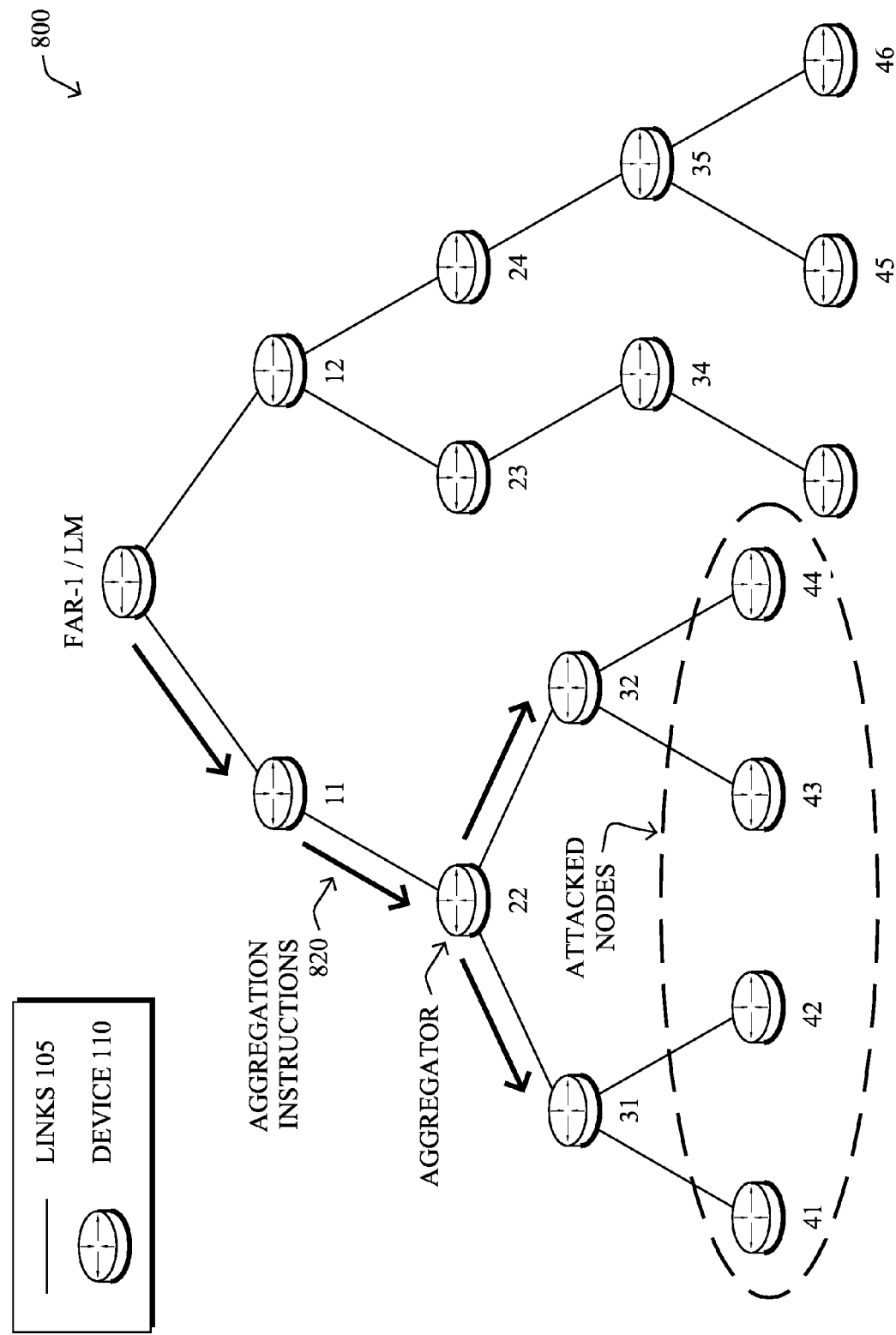

FEATURE AGGREGATION IN A COMPUTER NETWORK

RELATED APPLICATIONS

This application claims priority to U.S. Provisional Application No. 61/923,847, filed Jan. 6, 2014, entitled: COMPUTER NETWORK ANOMALY TRAINING AND DETECTION USING ARTIFICIAL NEURAL NETWORKS, by Vasseur, et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, and association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely on one or more ML techniques for performing a task for which they have not been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4G illustrate example techniques for collecting feature data in a computer network;

FIGS. 8A-8E illustrate an example of the aggregation of collected feature data;

DESCRIPTION OF EXAMPLE EMBODIMENTS

Overview

According to one or more embodiments of the disclosure, a device determines that input data to a machine learning model sent from a plurality of source nodes to an aggregation node is causing network congestion. A set of one or more other nodes to perform aggregation of the machine learning model input data is selected. A type of aggregation to be performed by the set of one or more other nodes is also selected. The set of one or more other nodes is also instructed to perform the selected type of aggregation on the data sent from the source nodes.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications), temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1:
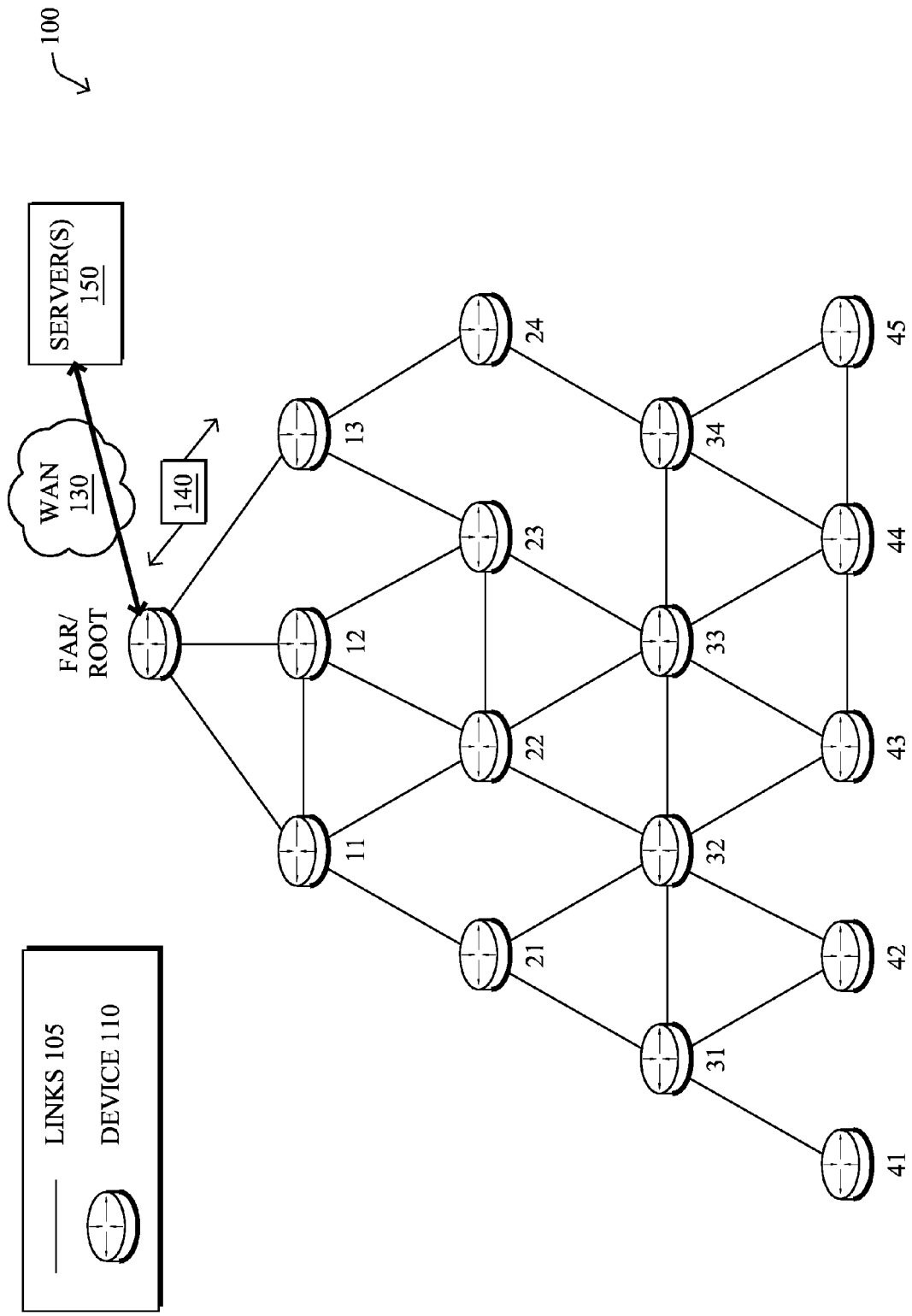
FIG. 1 illustrates an example communication network.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
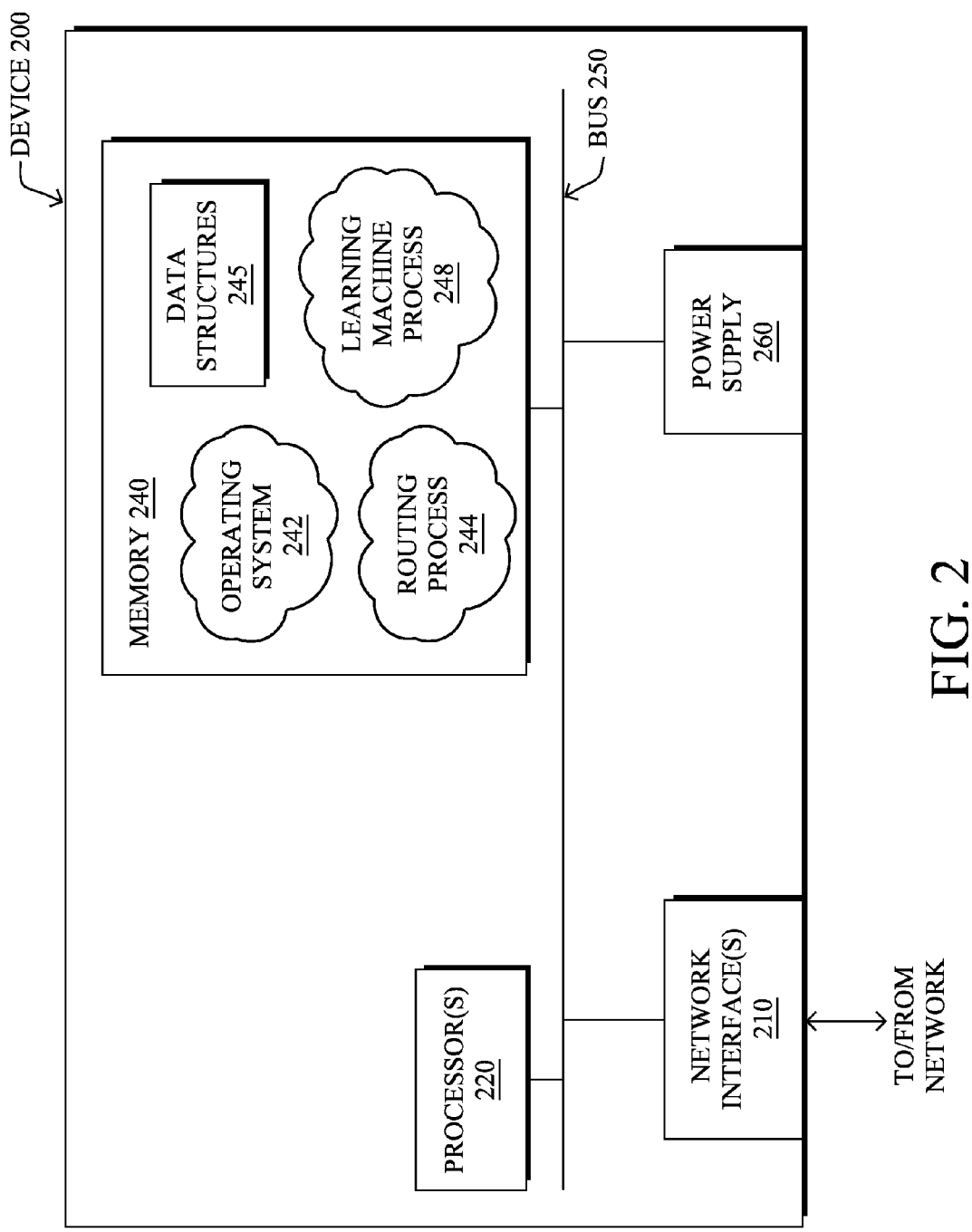
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating systems 242, portions of which are typically resident in memory 240 and executed by the processor, functionally organizes the device by, inter alia, invoking operations in support of software processes and/or services executing on the device. These software processes and/or services may comprise routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols, as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnects are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward, and terminating at, one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
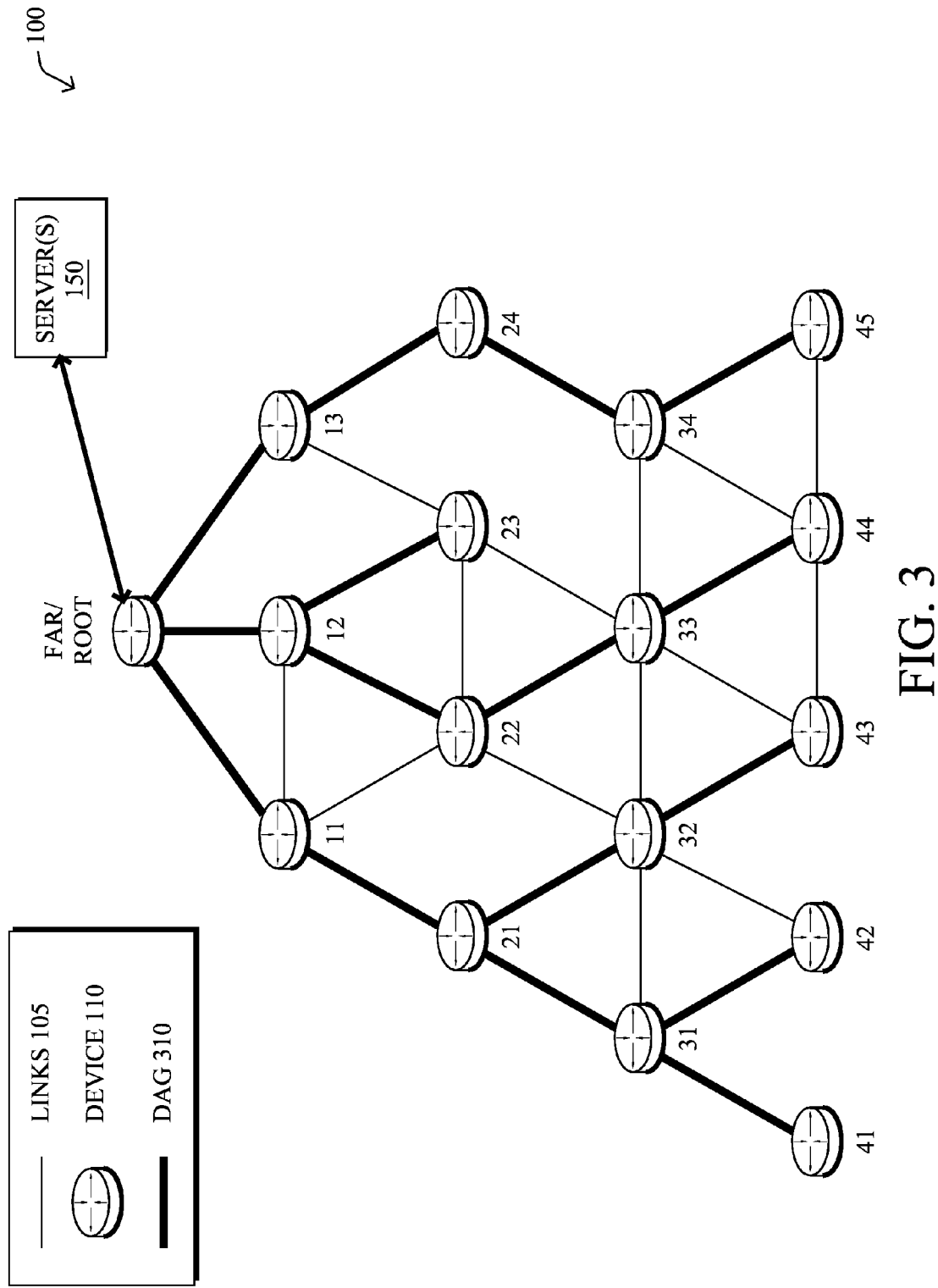
FIG. 3 illustrates an example directed acyclic graph (DAG) in the communication network of FIG. 1.
Figure 4A:
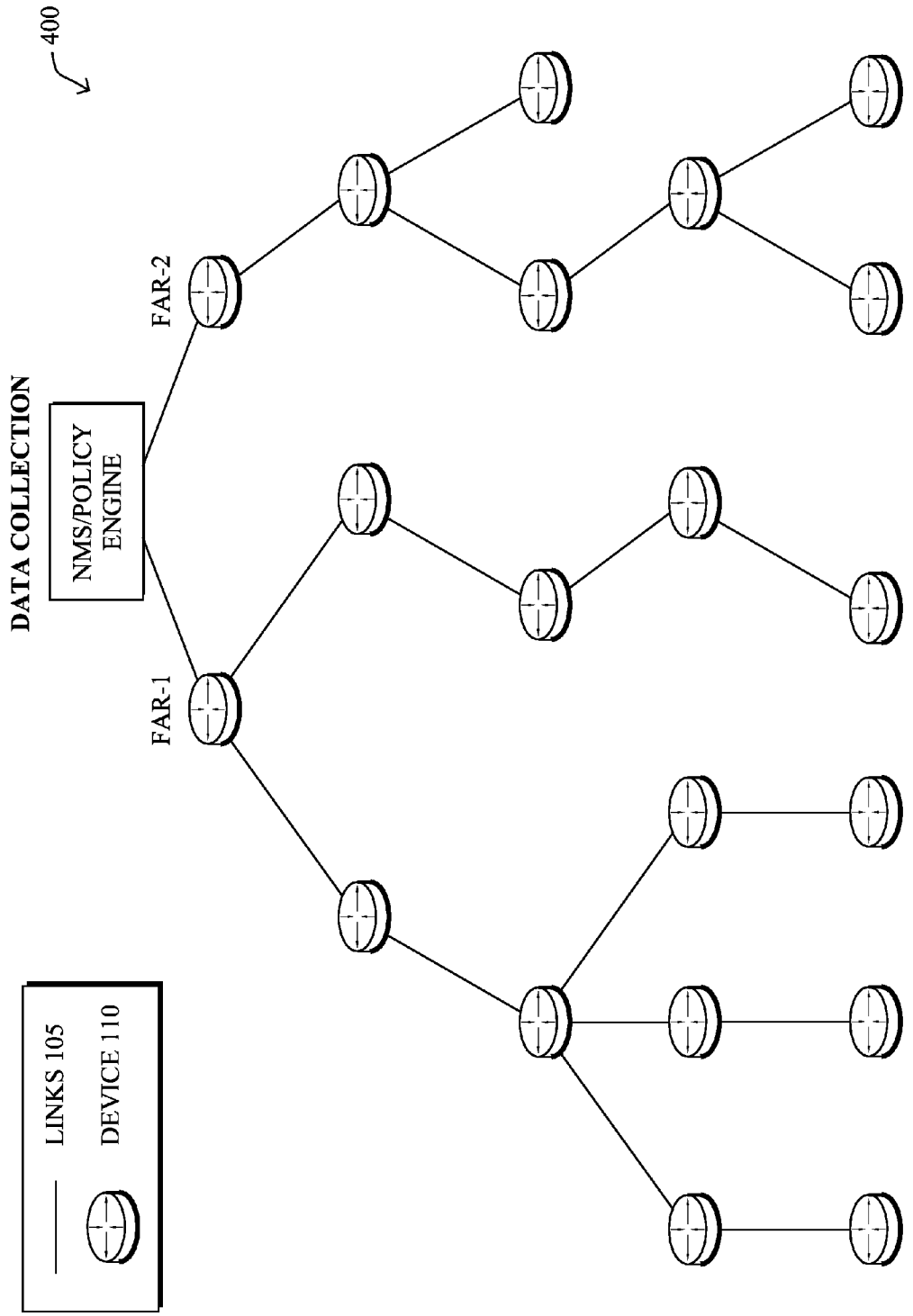
Figure 4B:
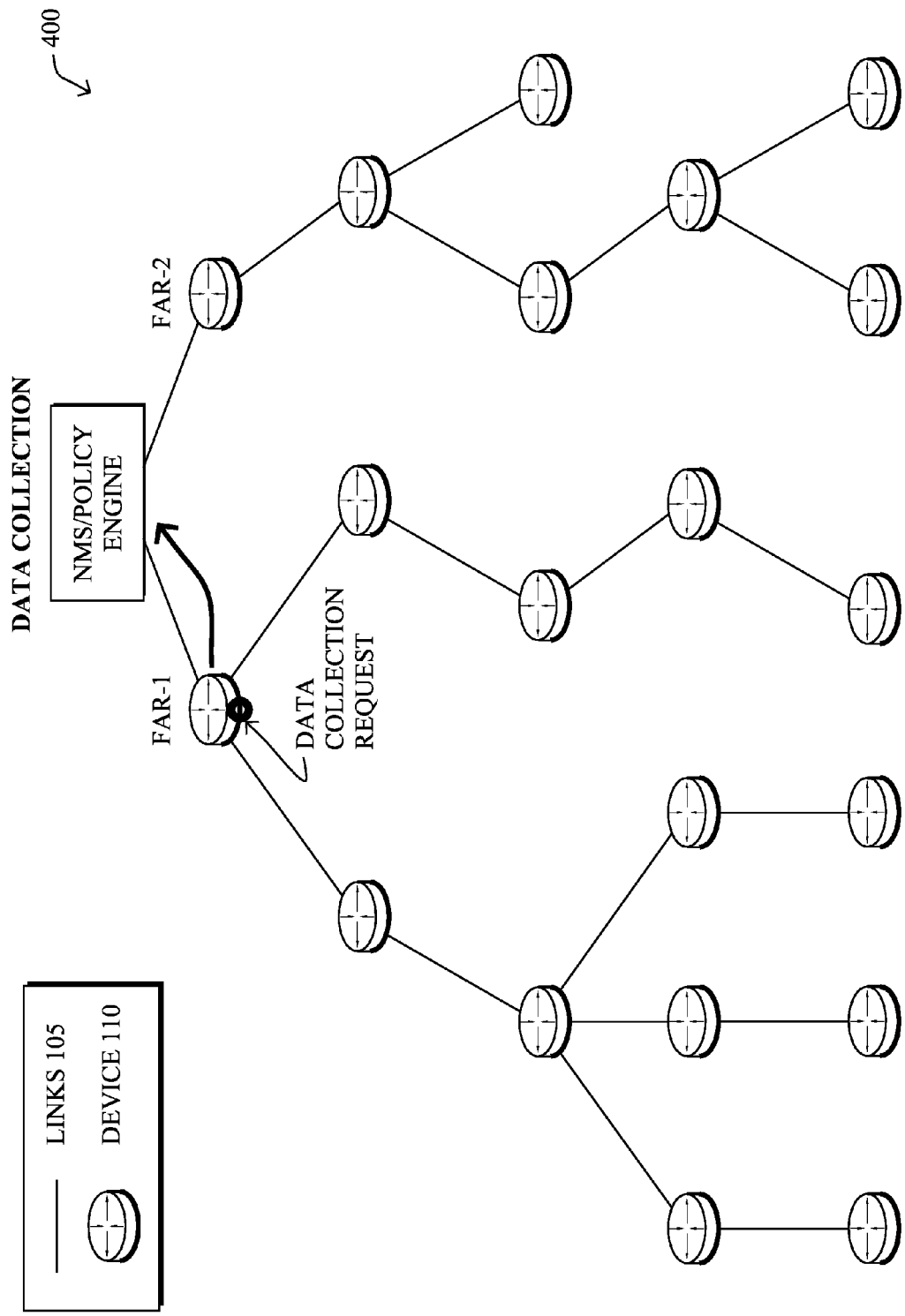
Figure 4C:
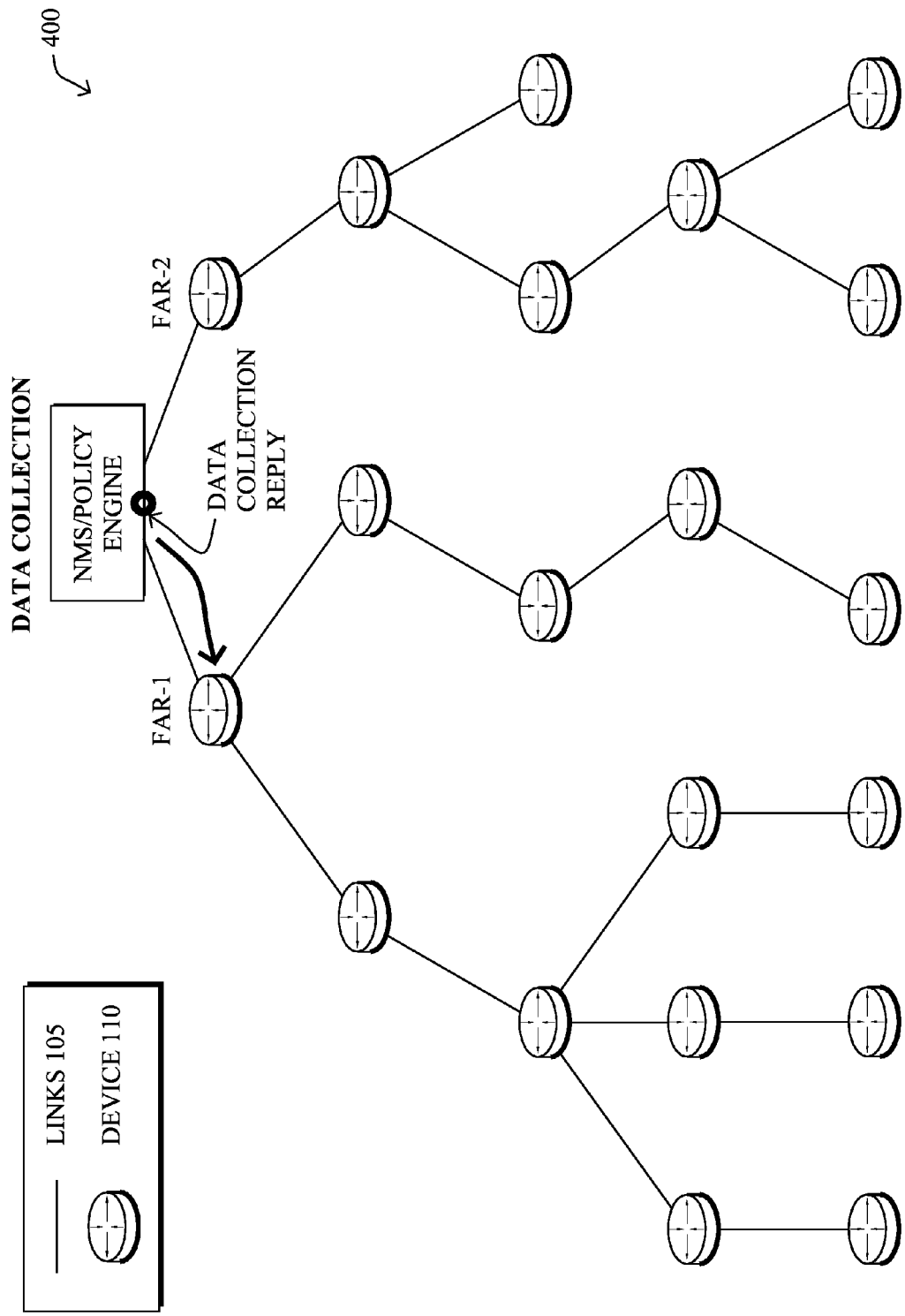
Figure 4D:
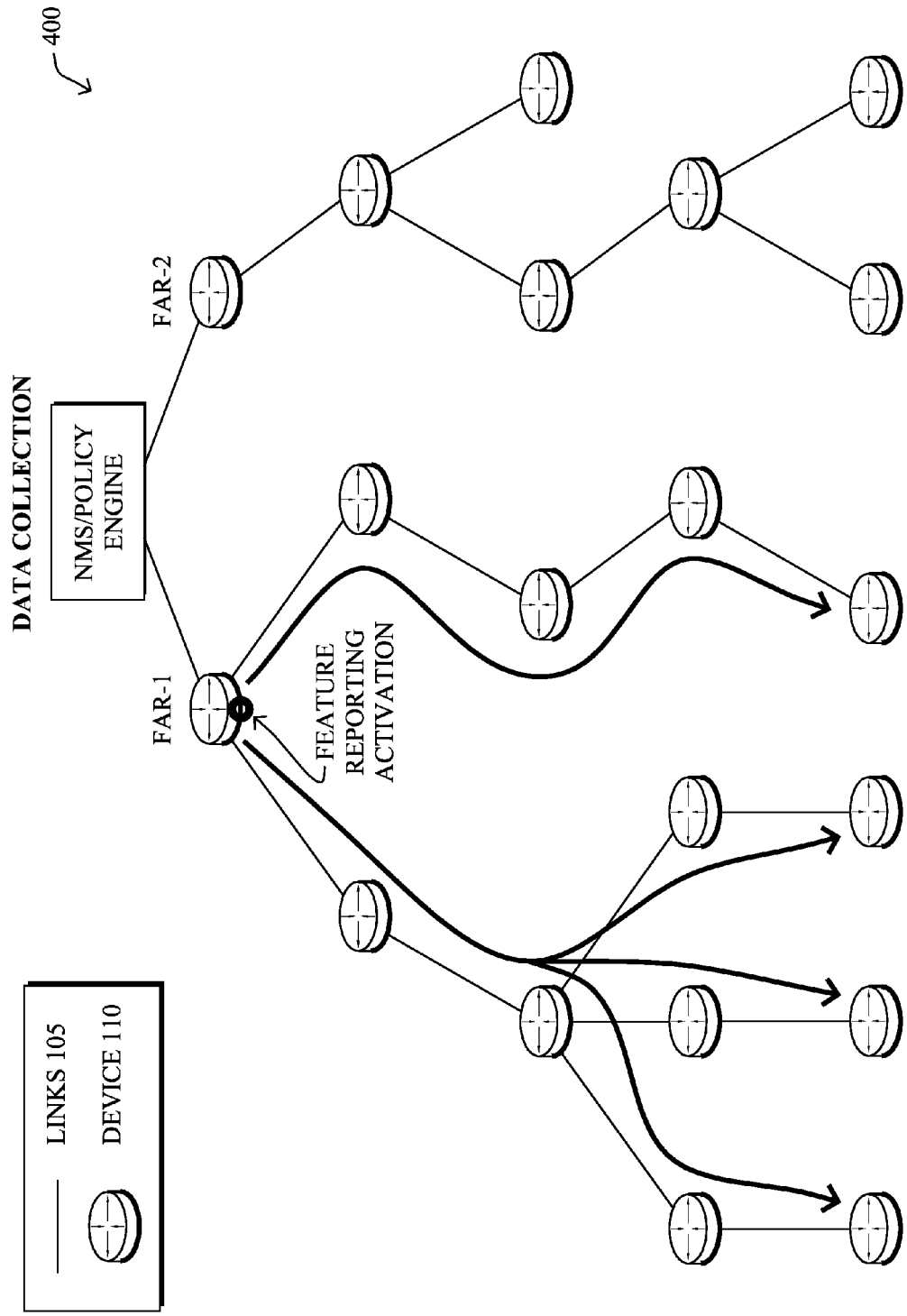
Figure 4E:
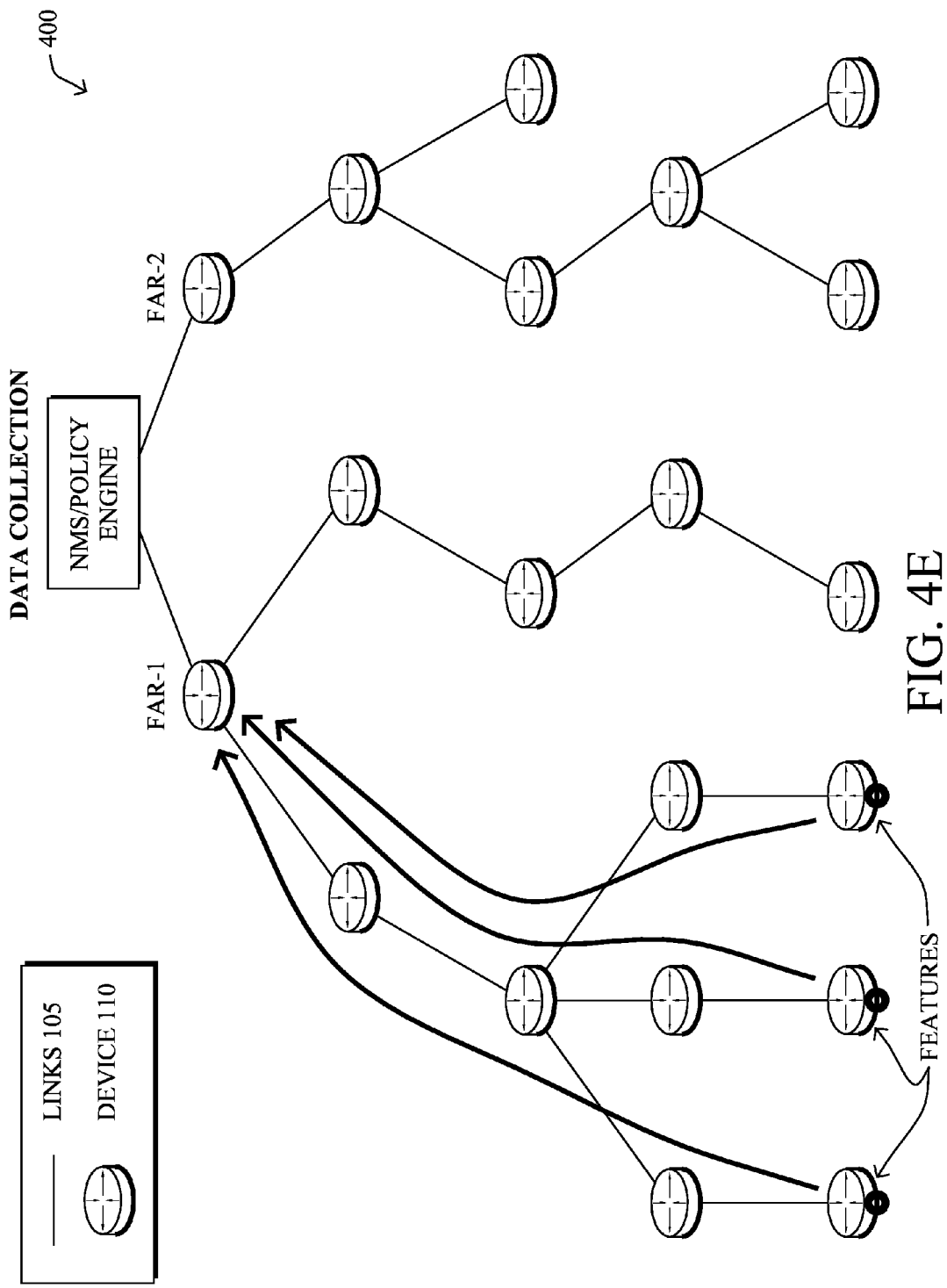
Figure 4G:
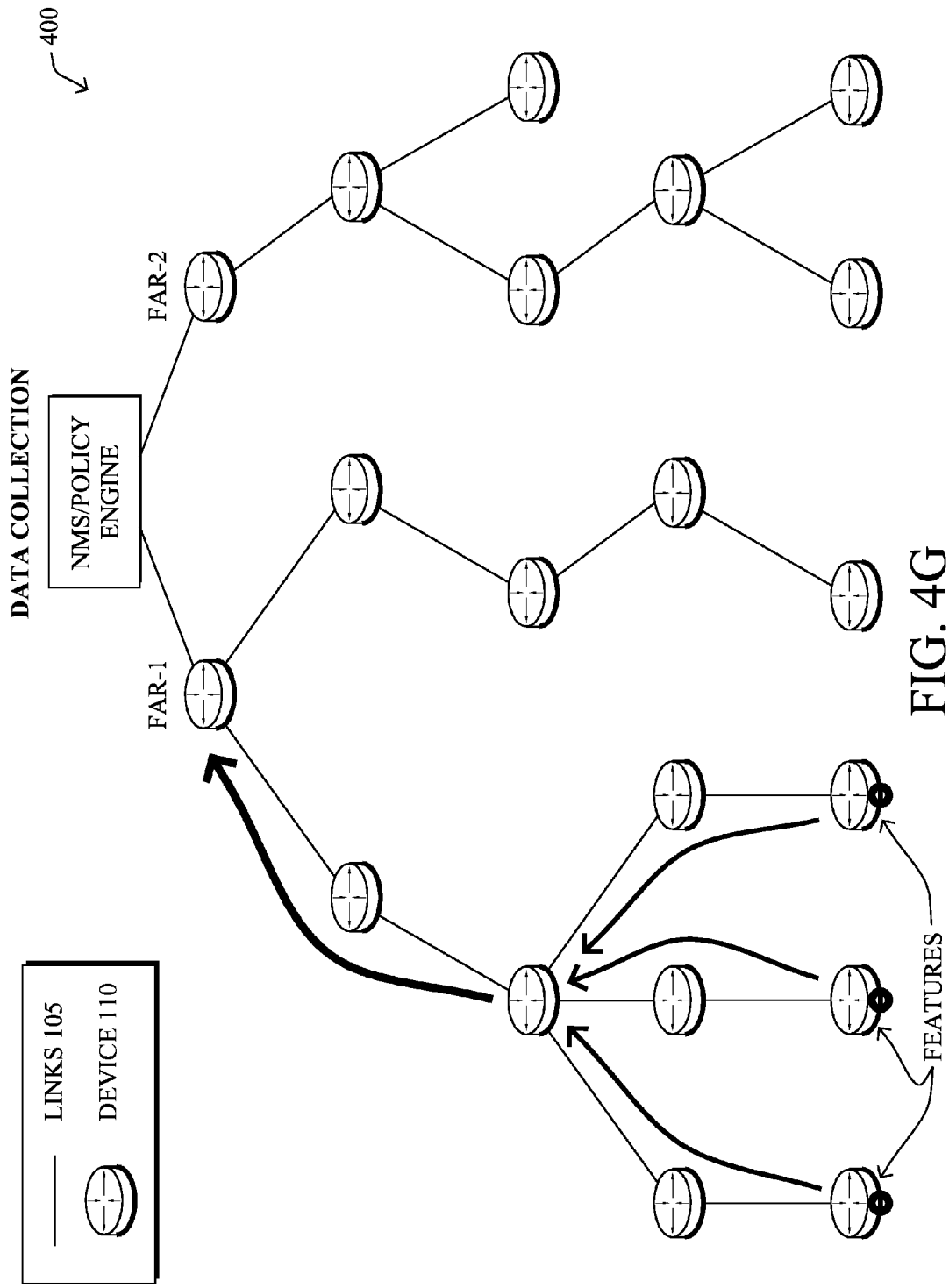
Figure 5A:
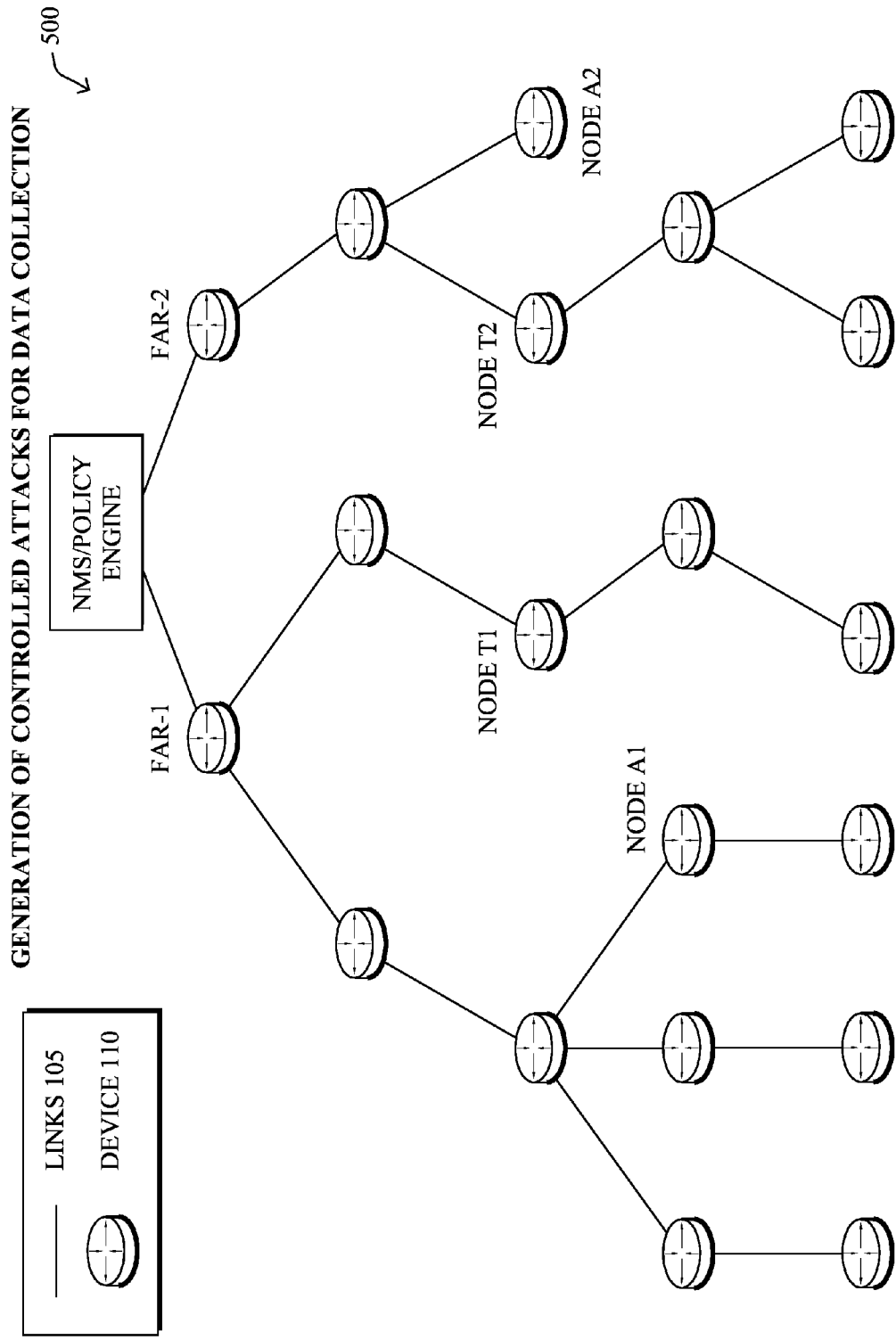
FIGS. 5A-5F illustrate example techniques for generating feature data by simulating network attacks.
Figure 5B:
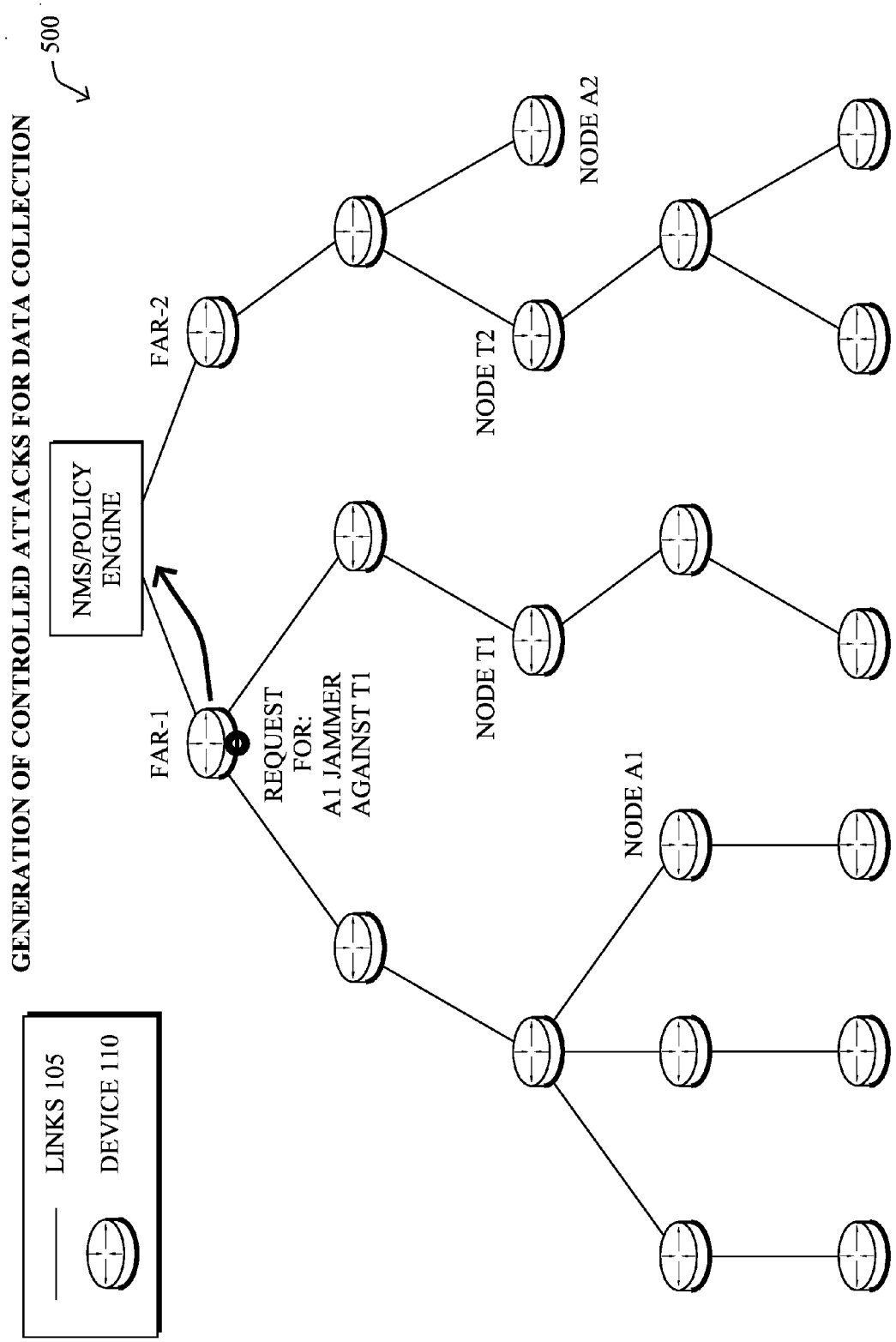
Figure 5C:
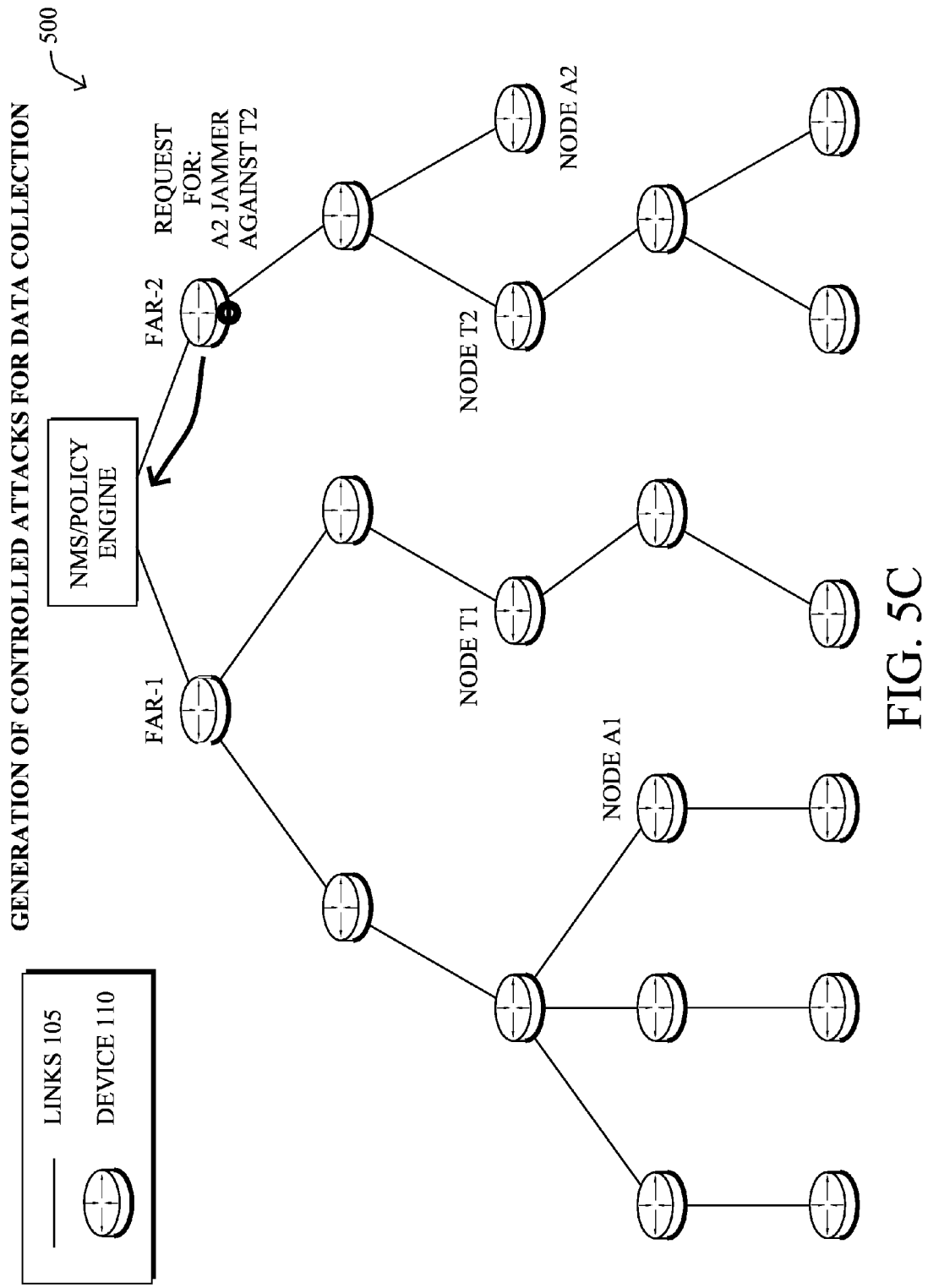
Figure 5D:
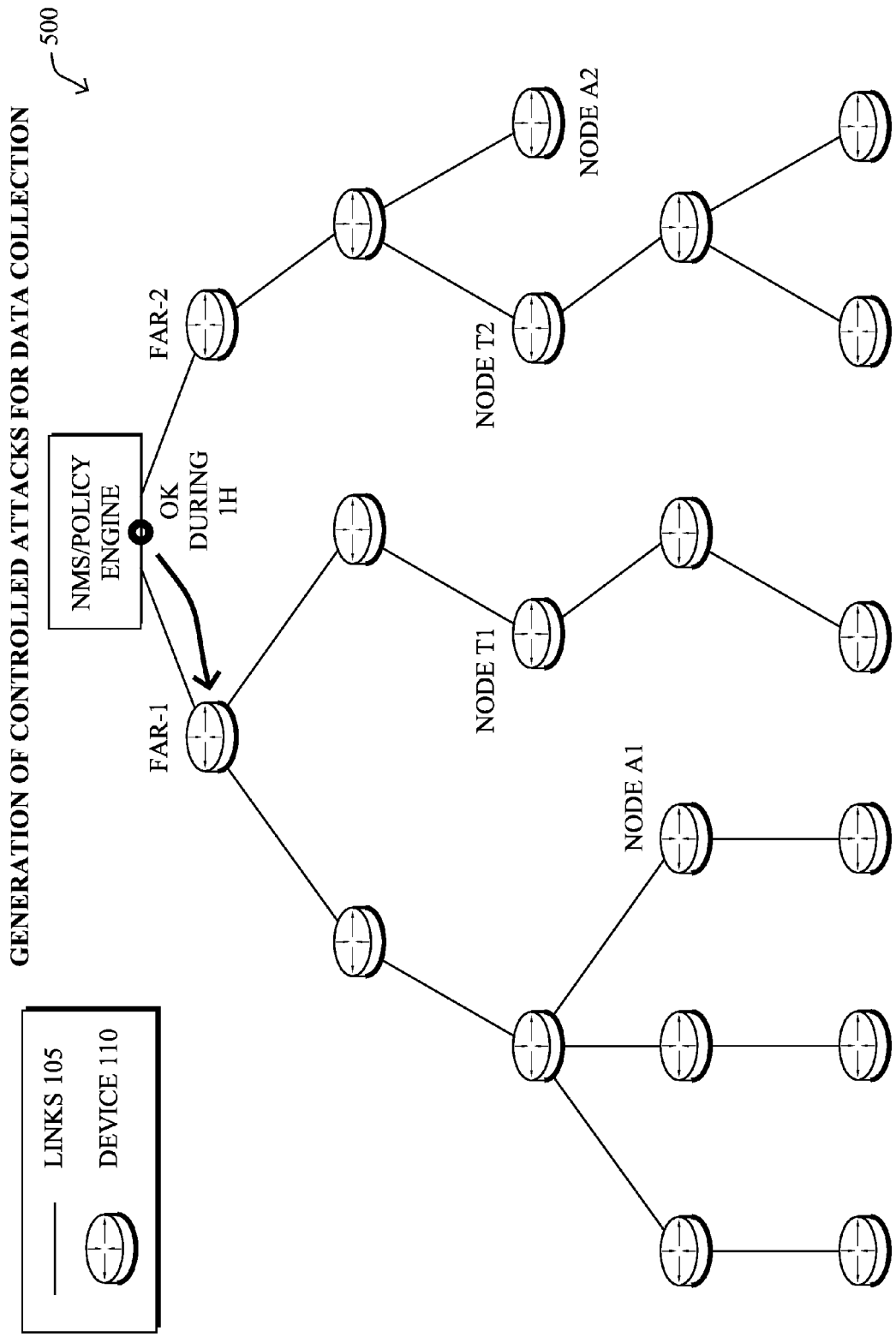
Figure 5E:
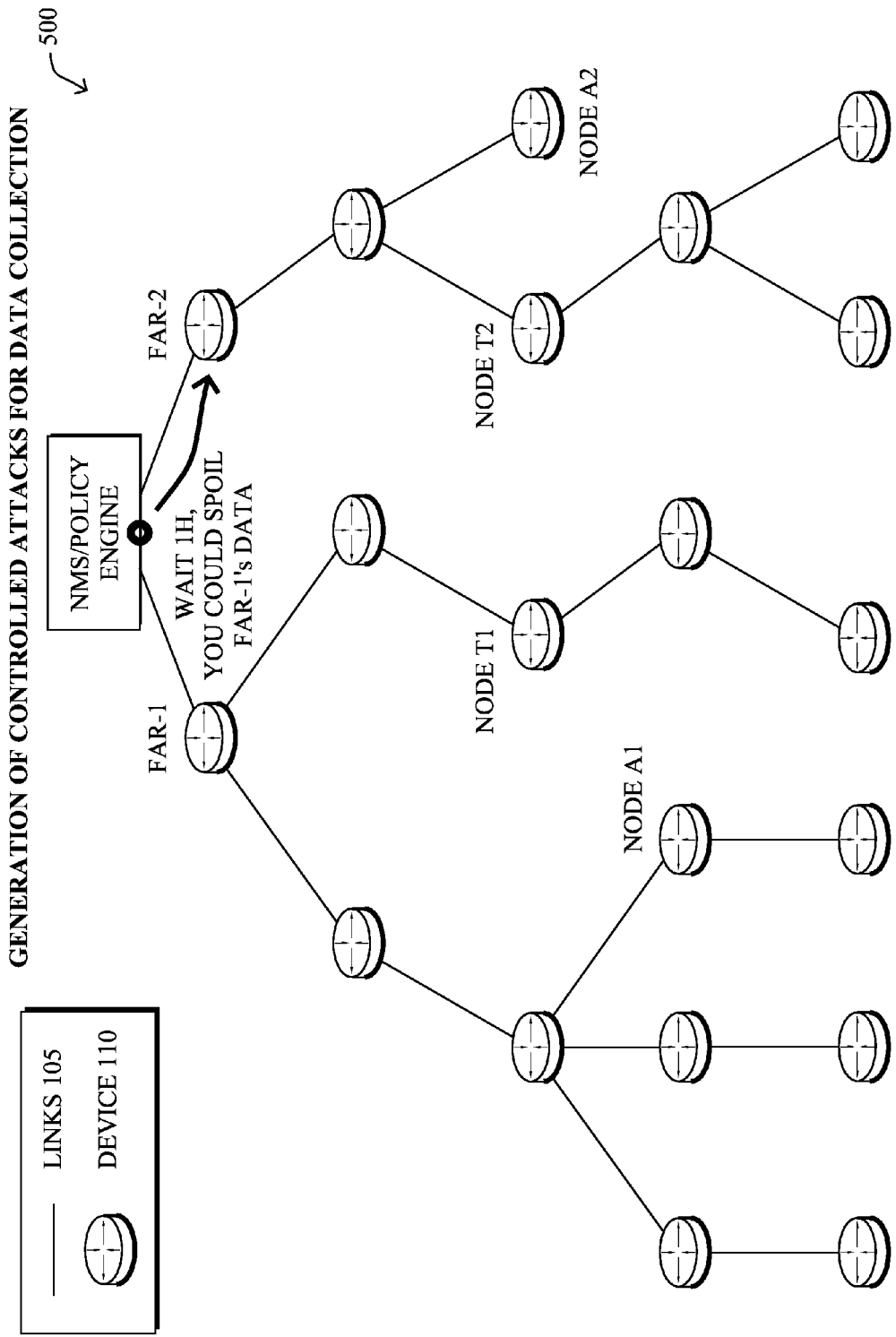
Figure 5F:
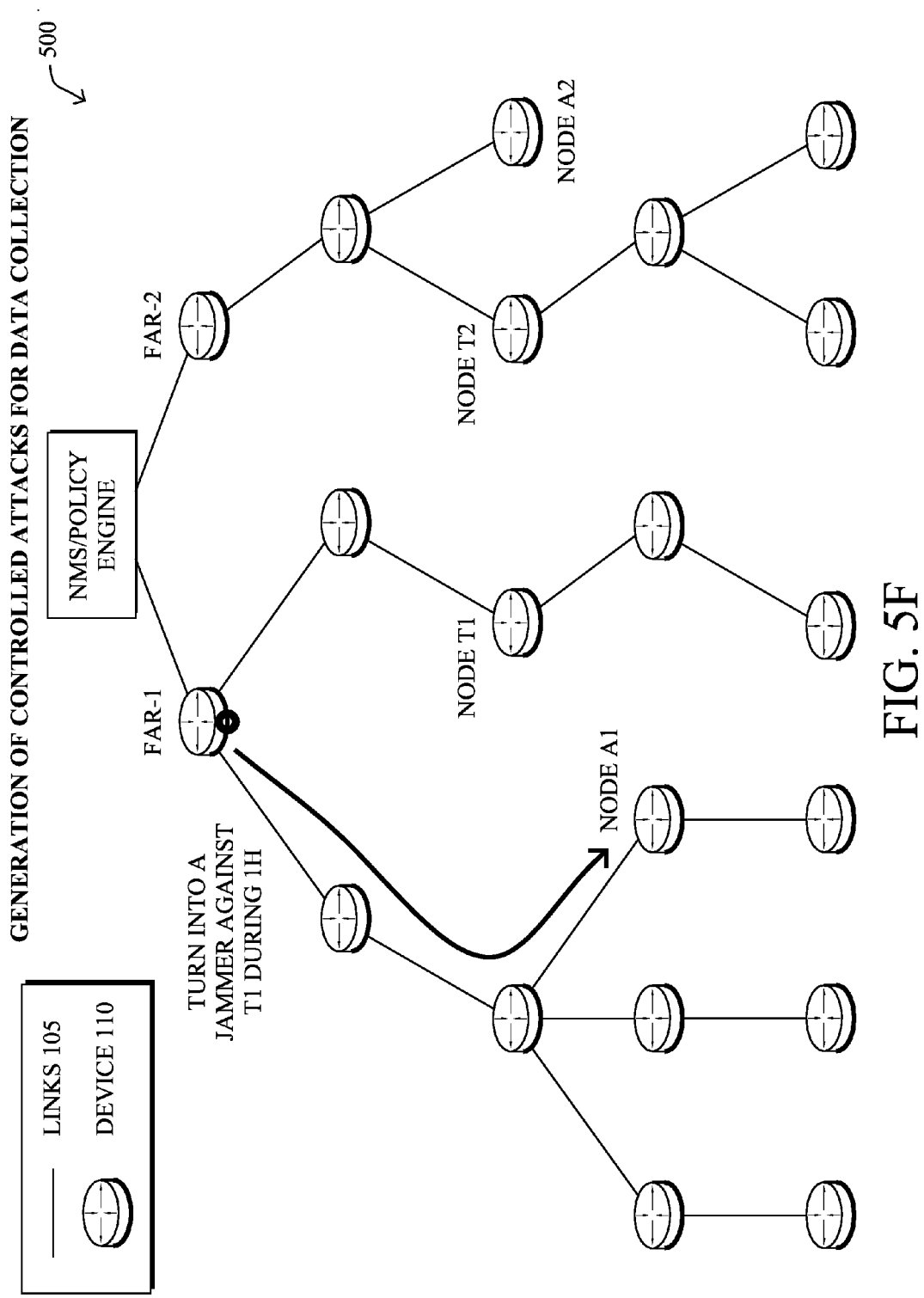
Figure 6A:
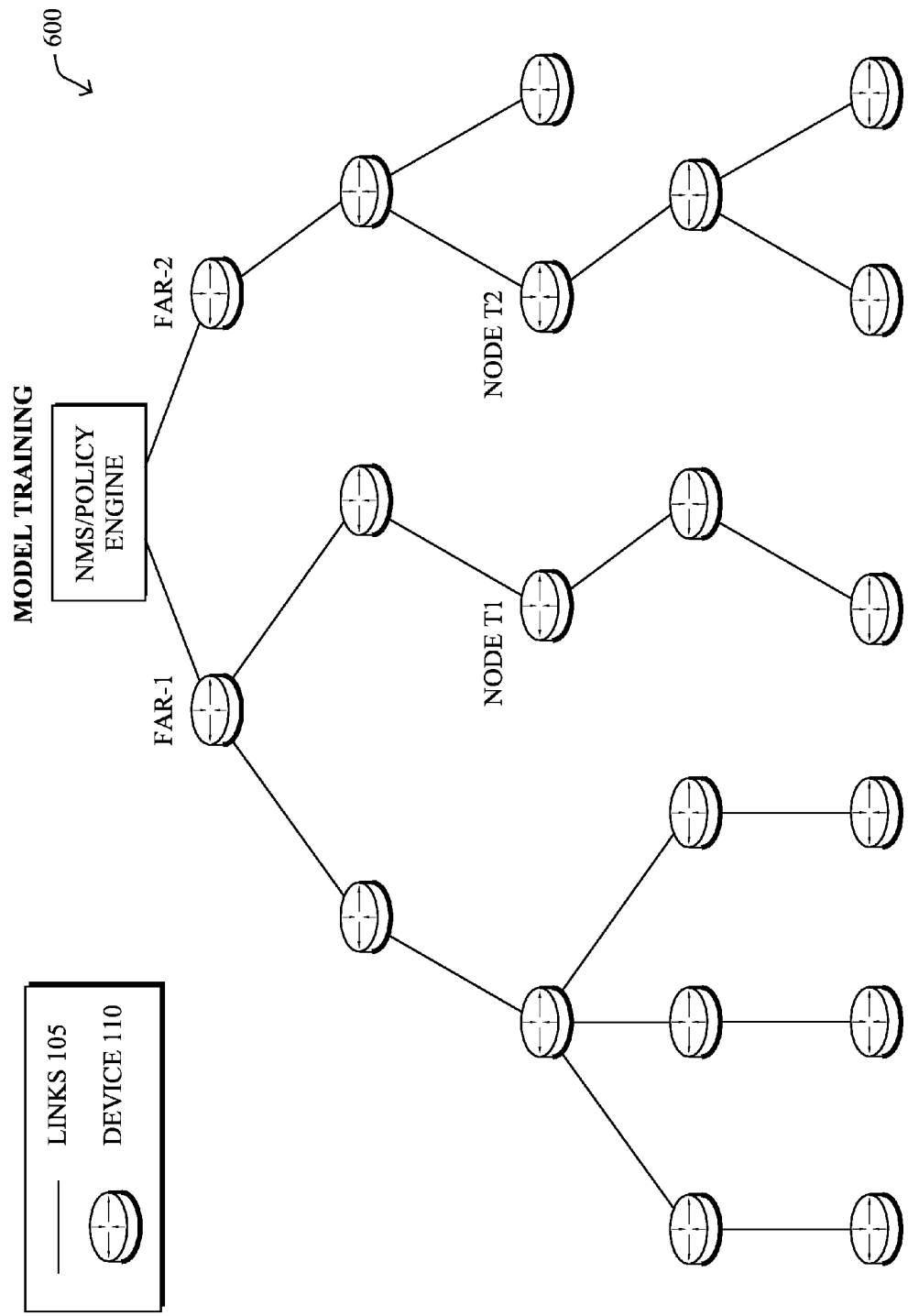
FIGS. 6A-6P illustrate example techniques for training a machine learning model in a computer network.
Figure 6B:
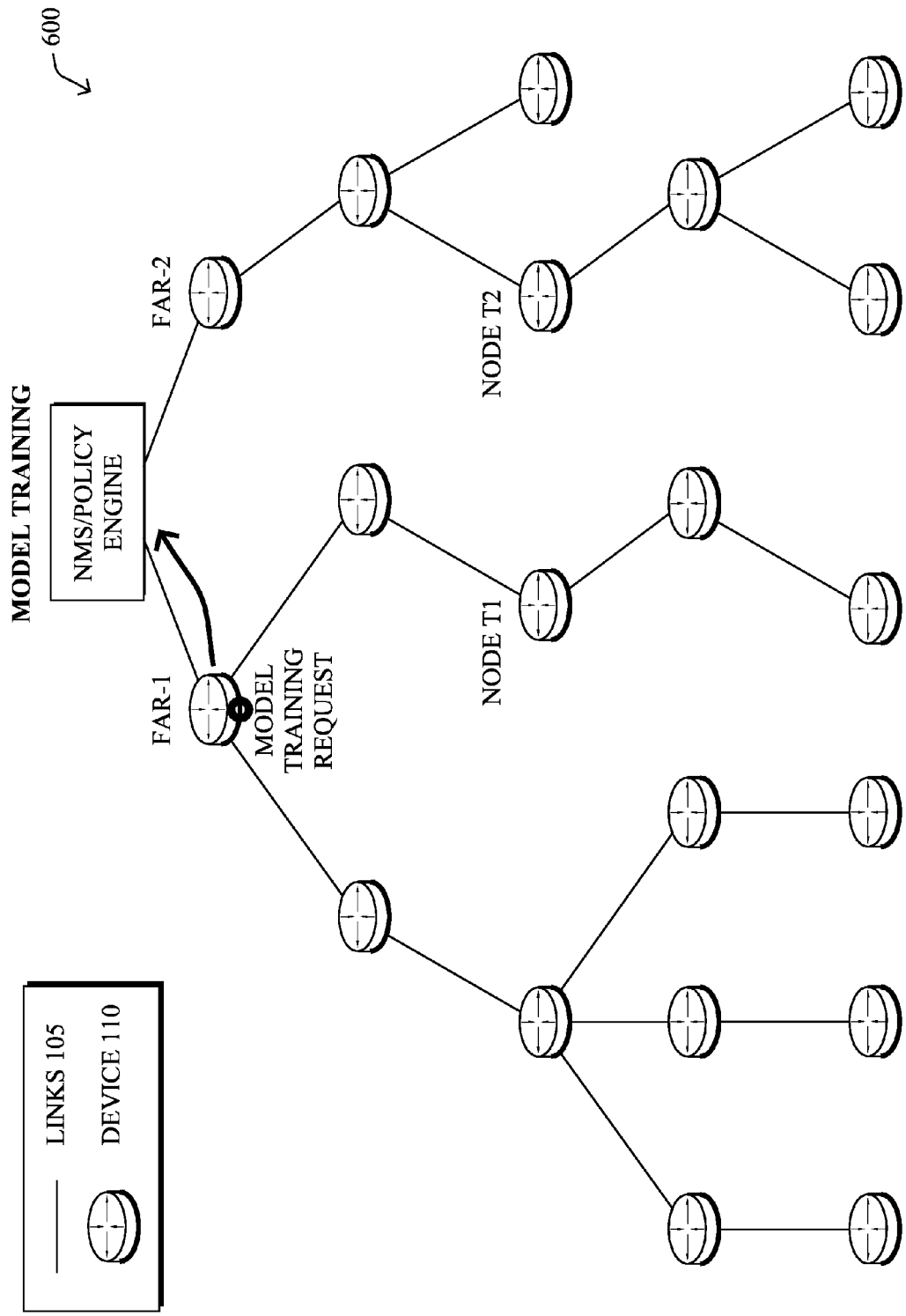
Figure 6C:
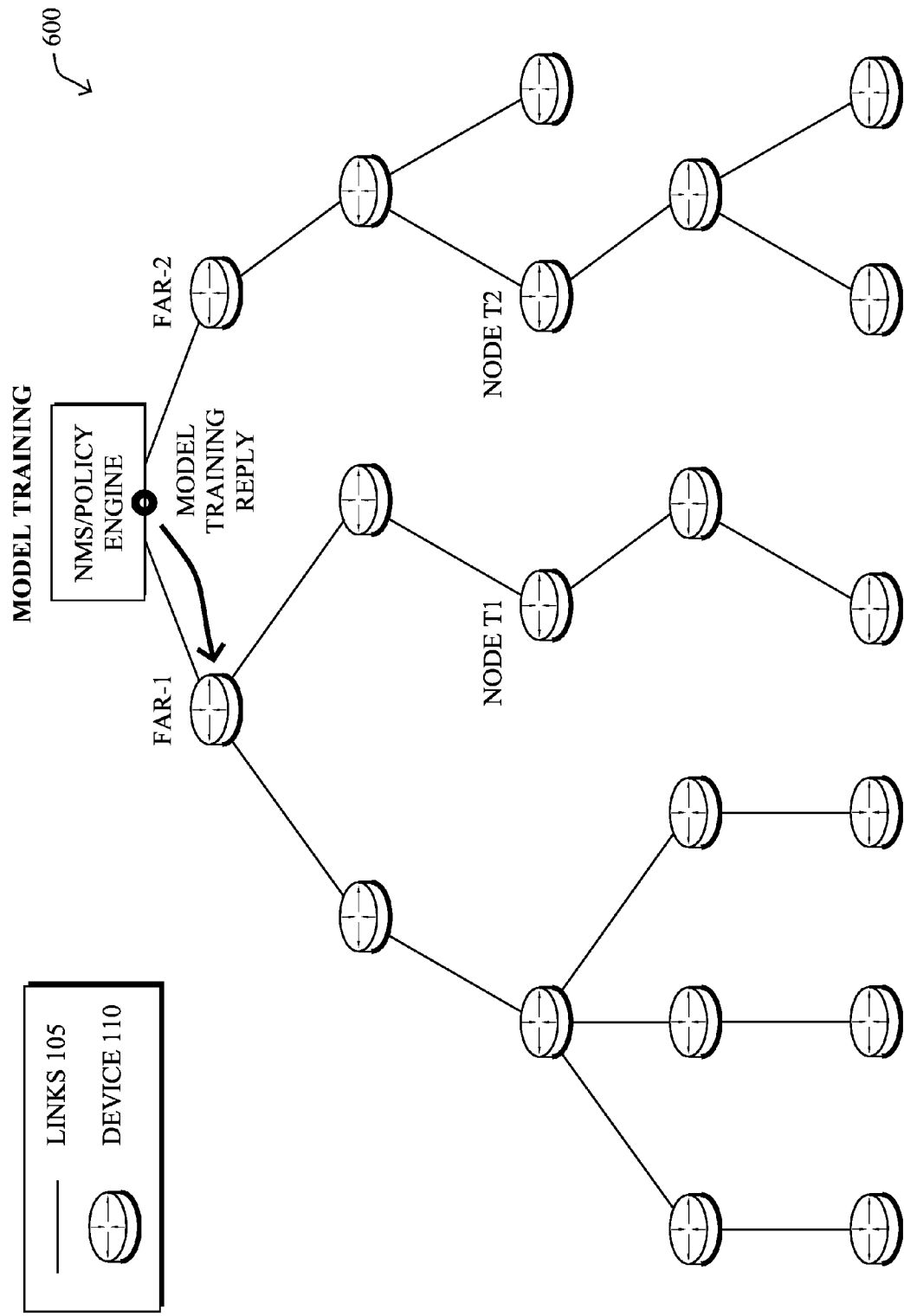
Figure 6D:
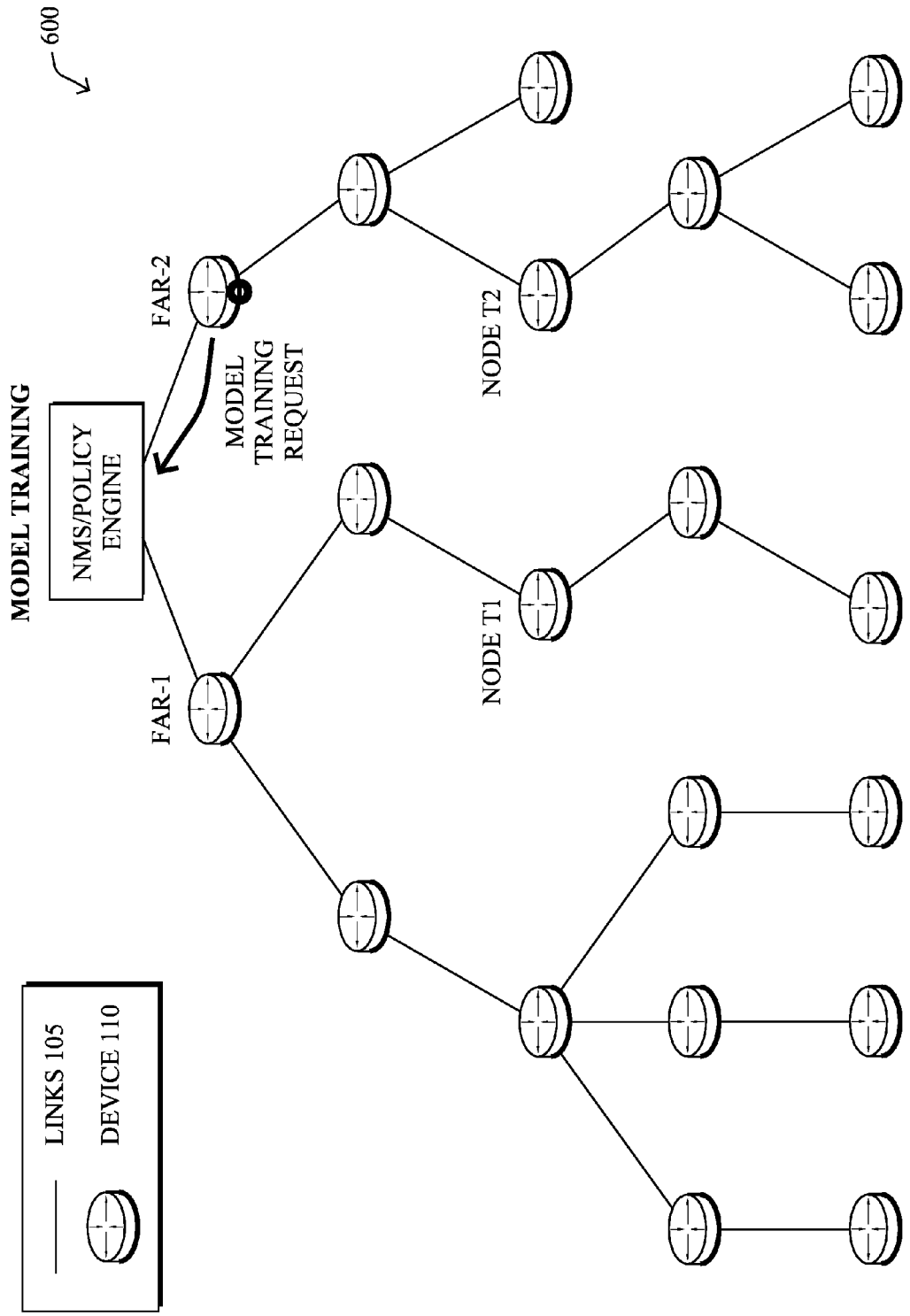
Figure 6E:
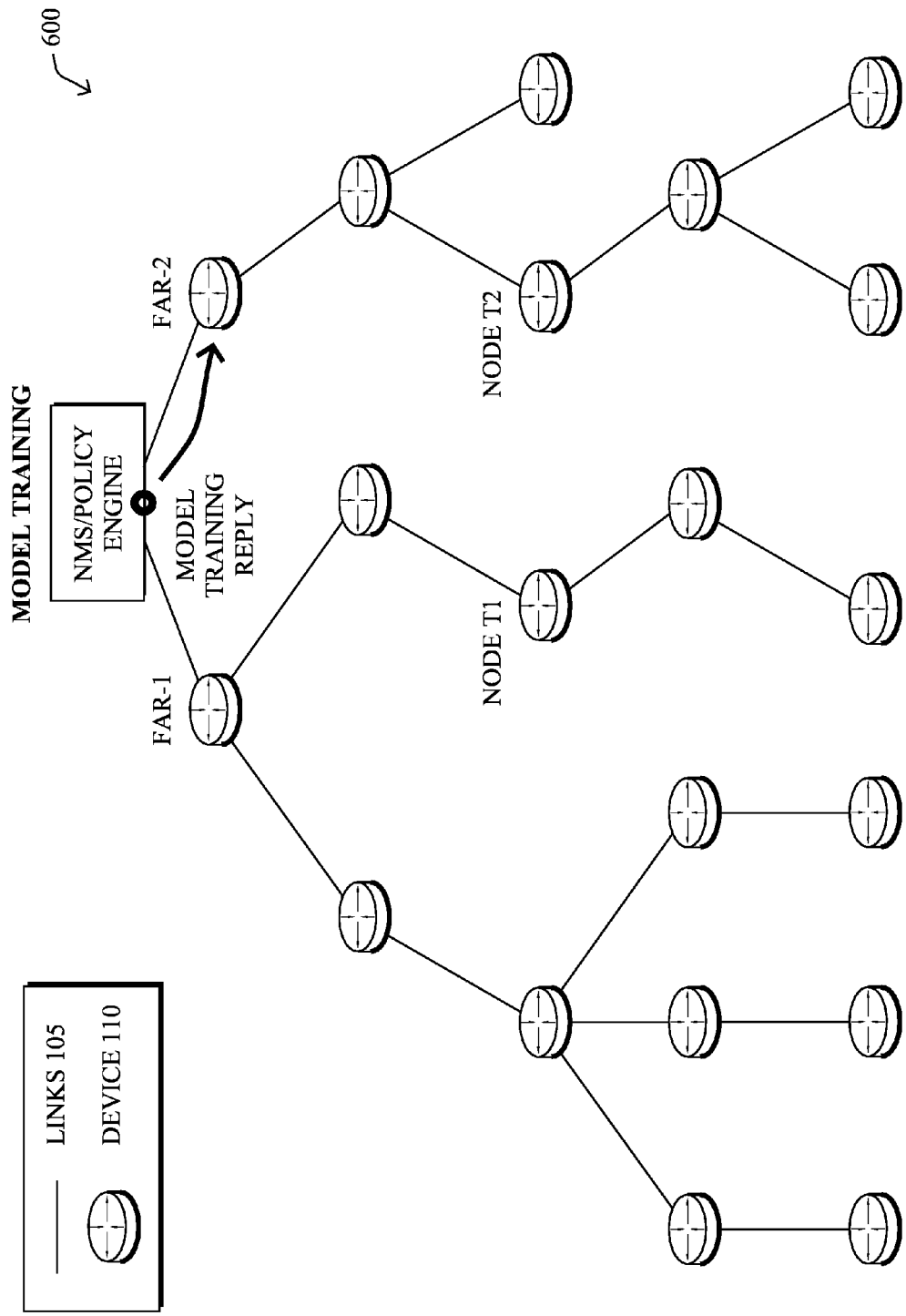
Figure 6F:
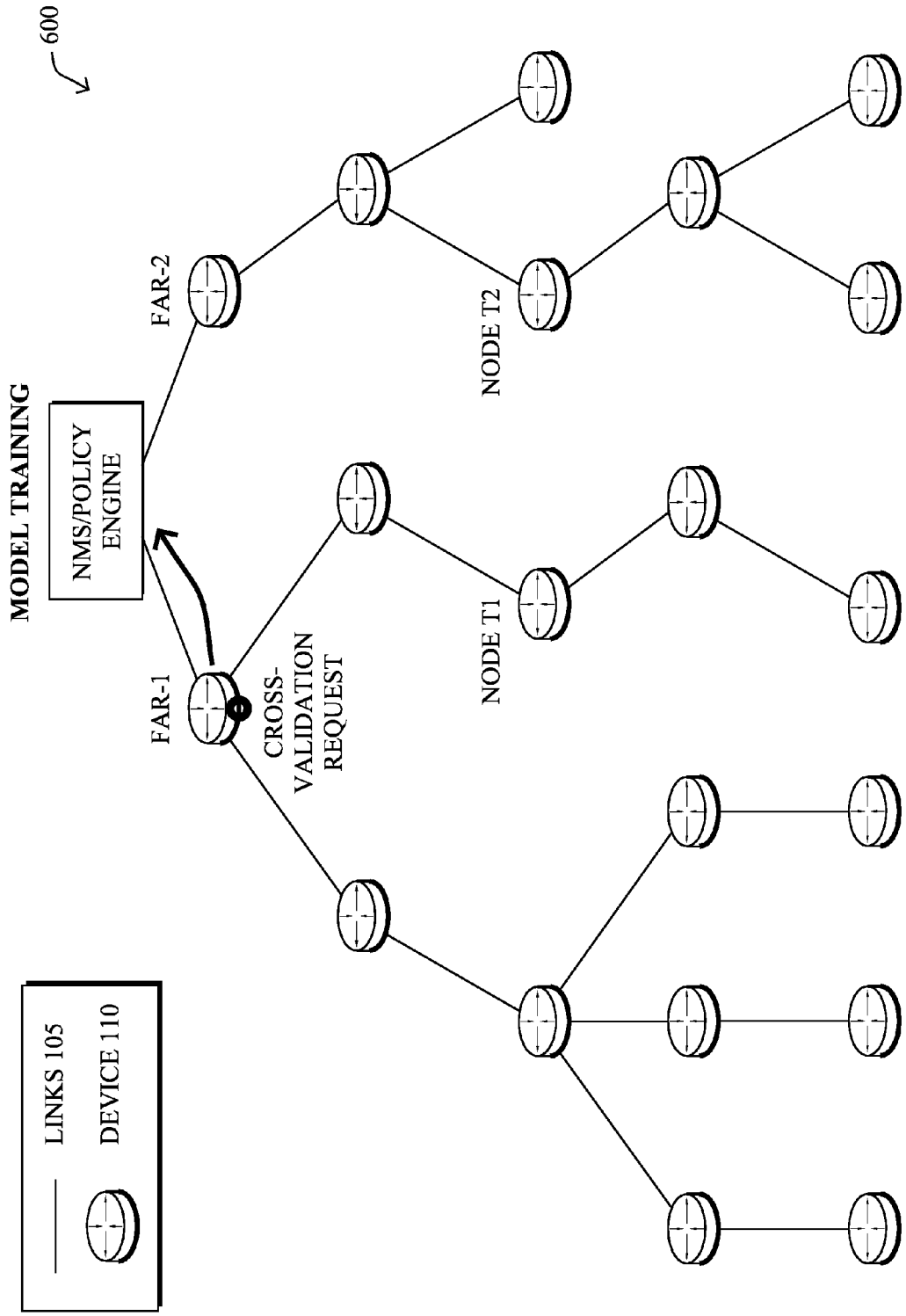
Figure 6G:
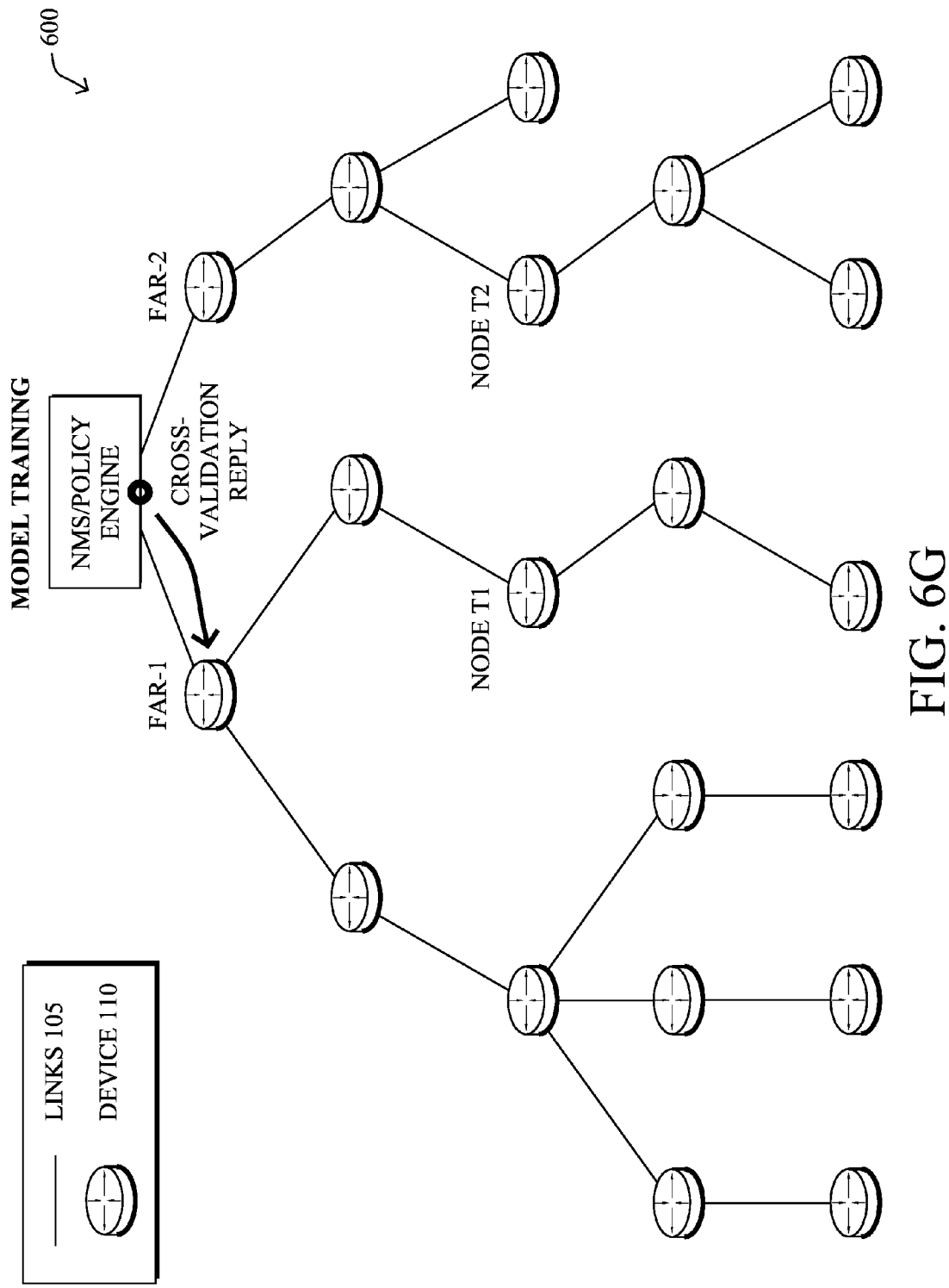
Figure 6H:
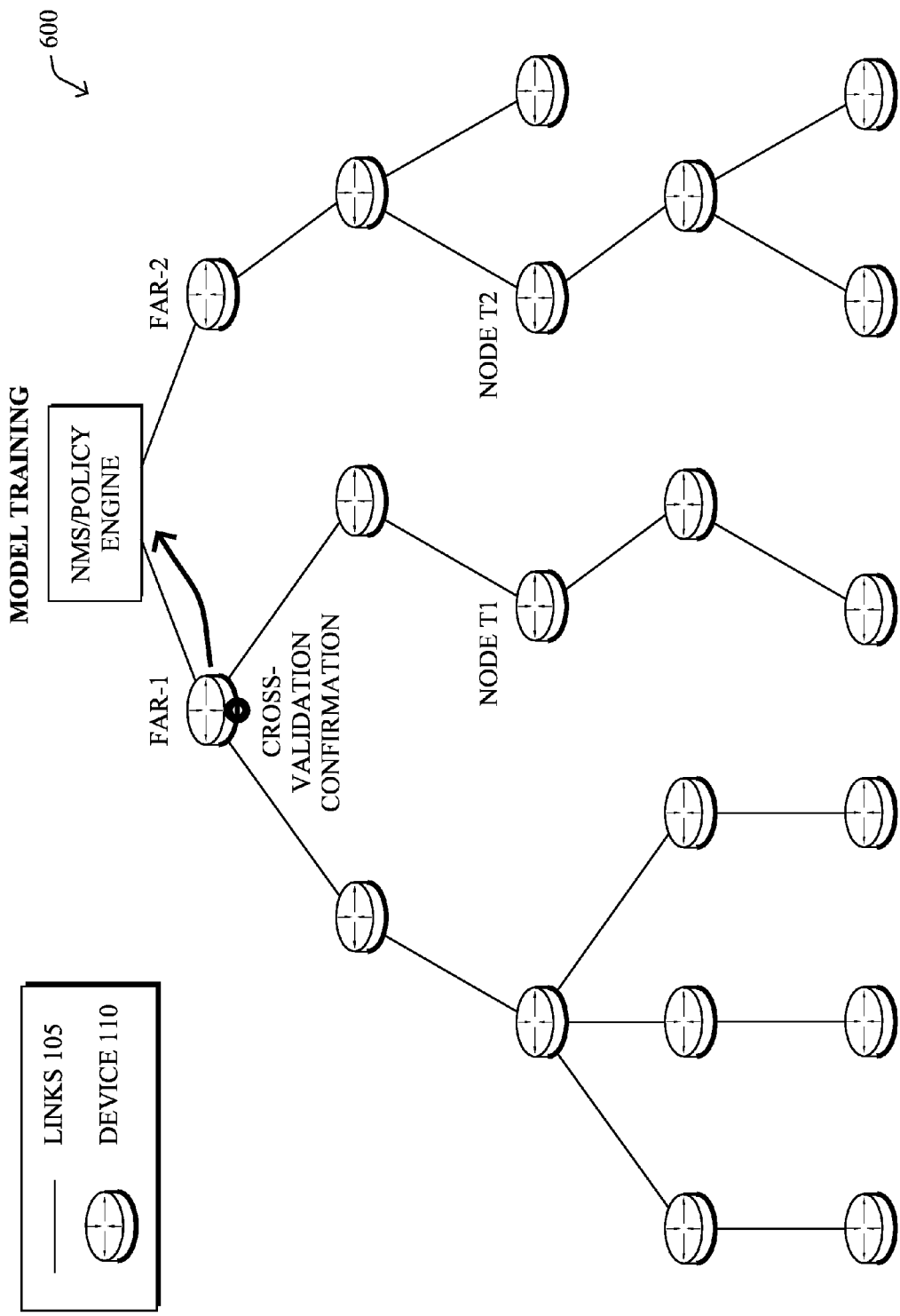
Figure 6I:
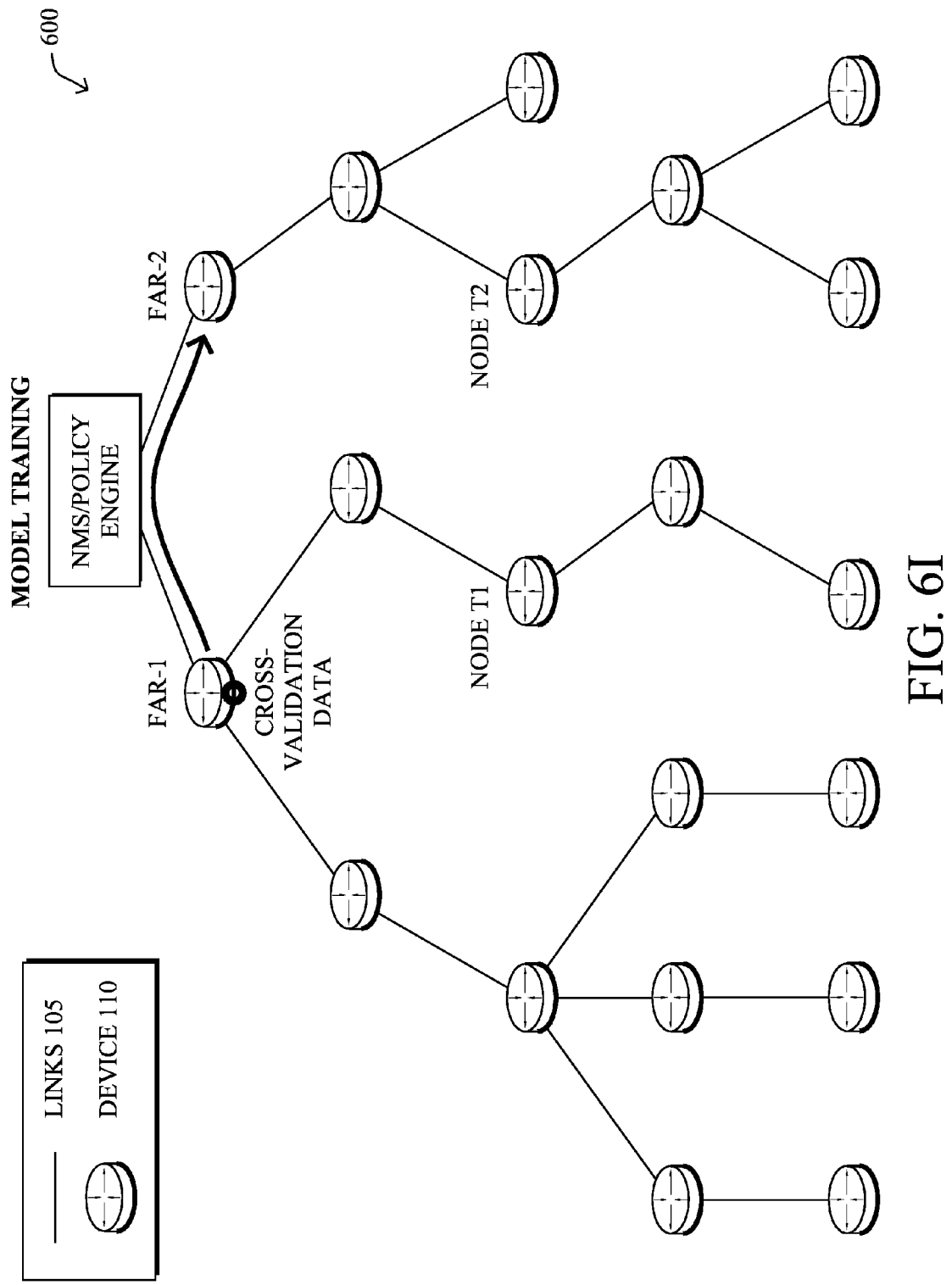
Figure 6J:
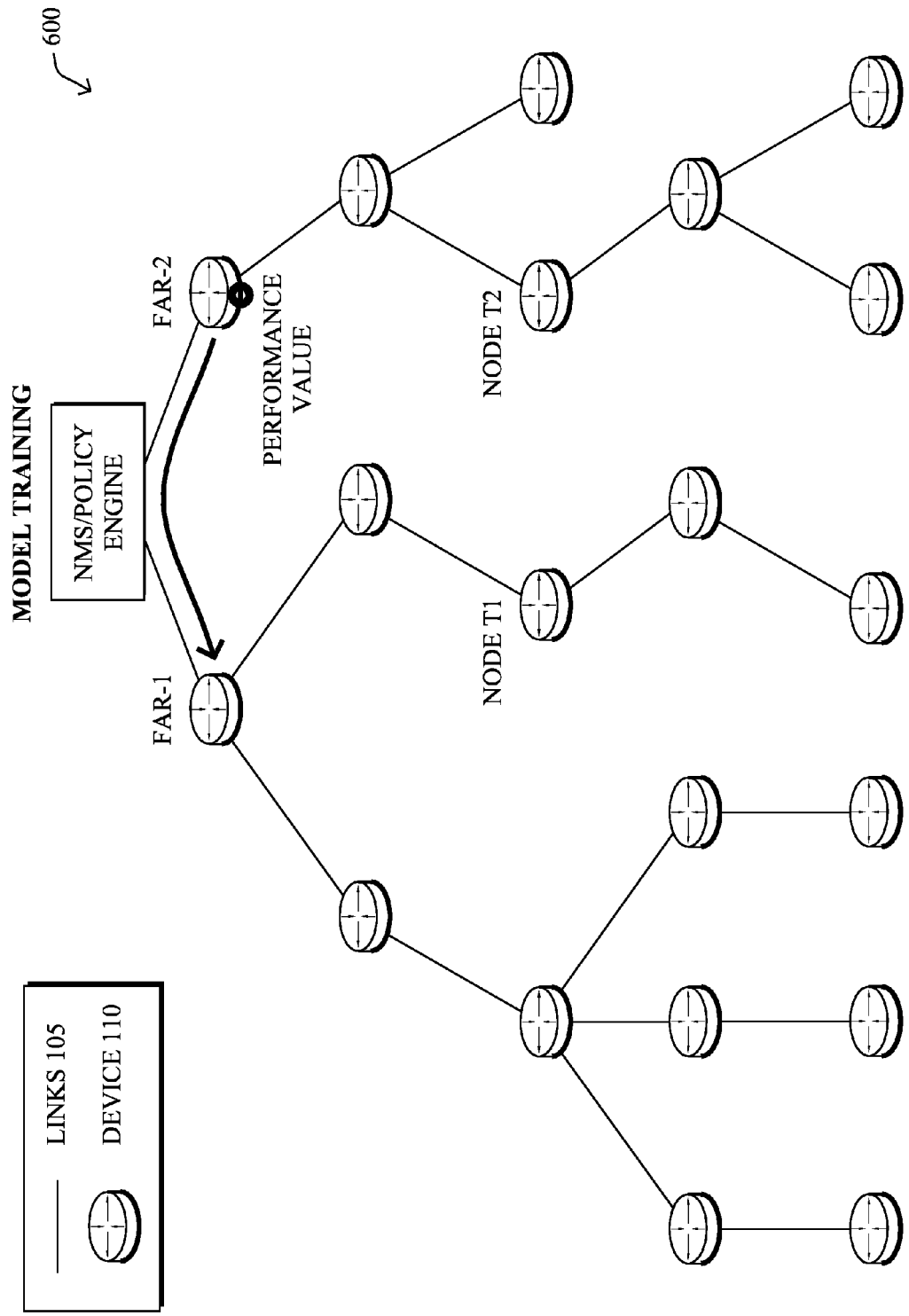
Figure 6K:
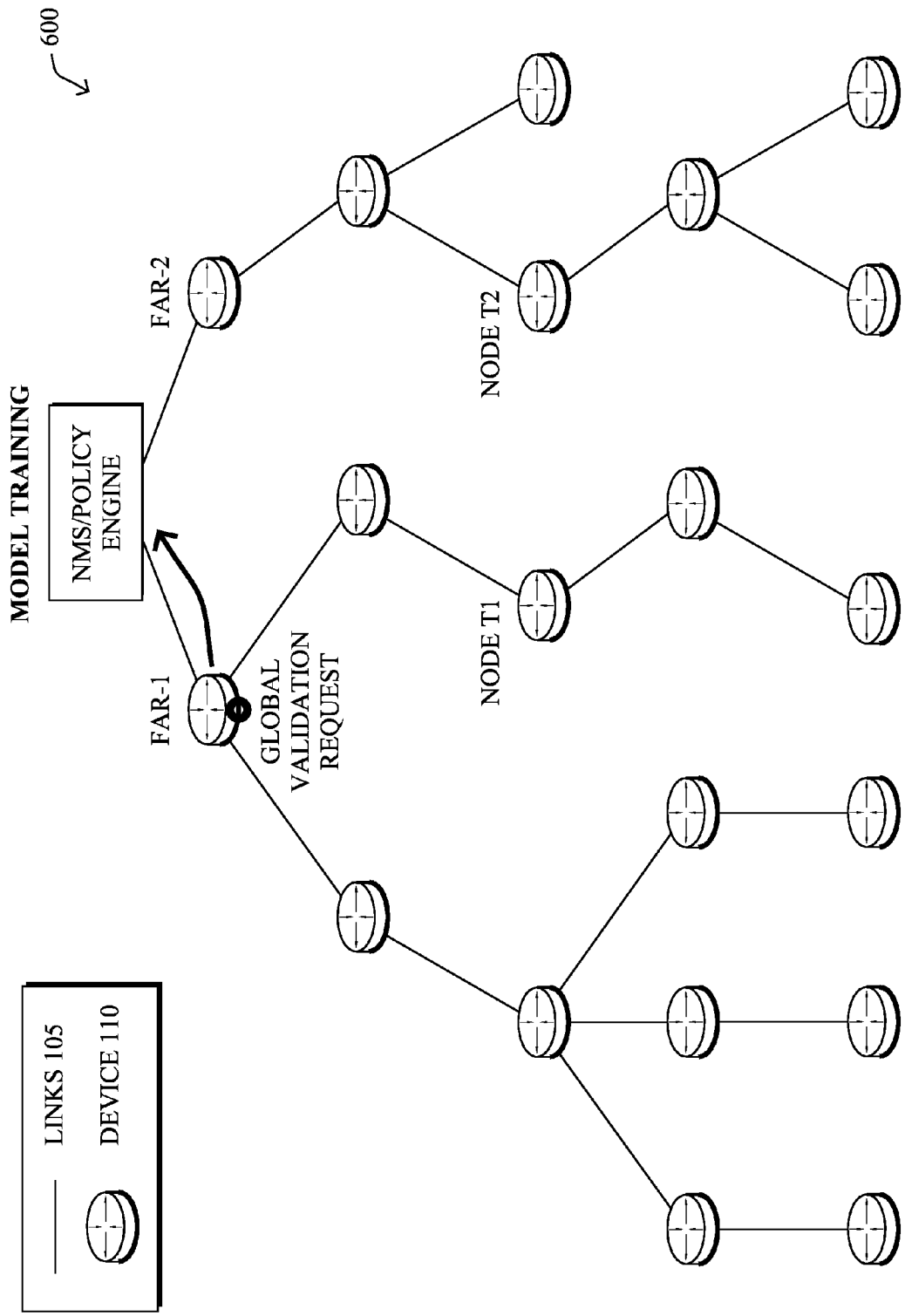
Figure 6L:
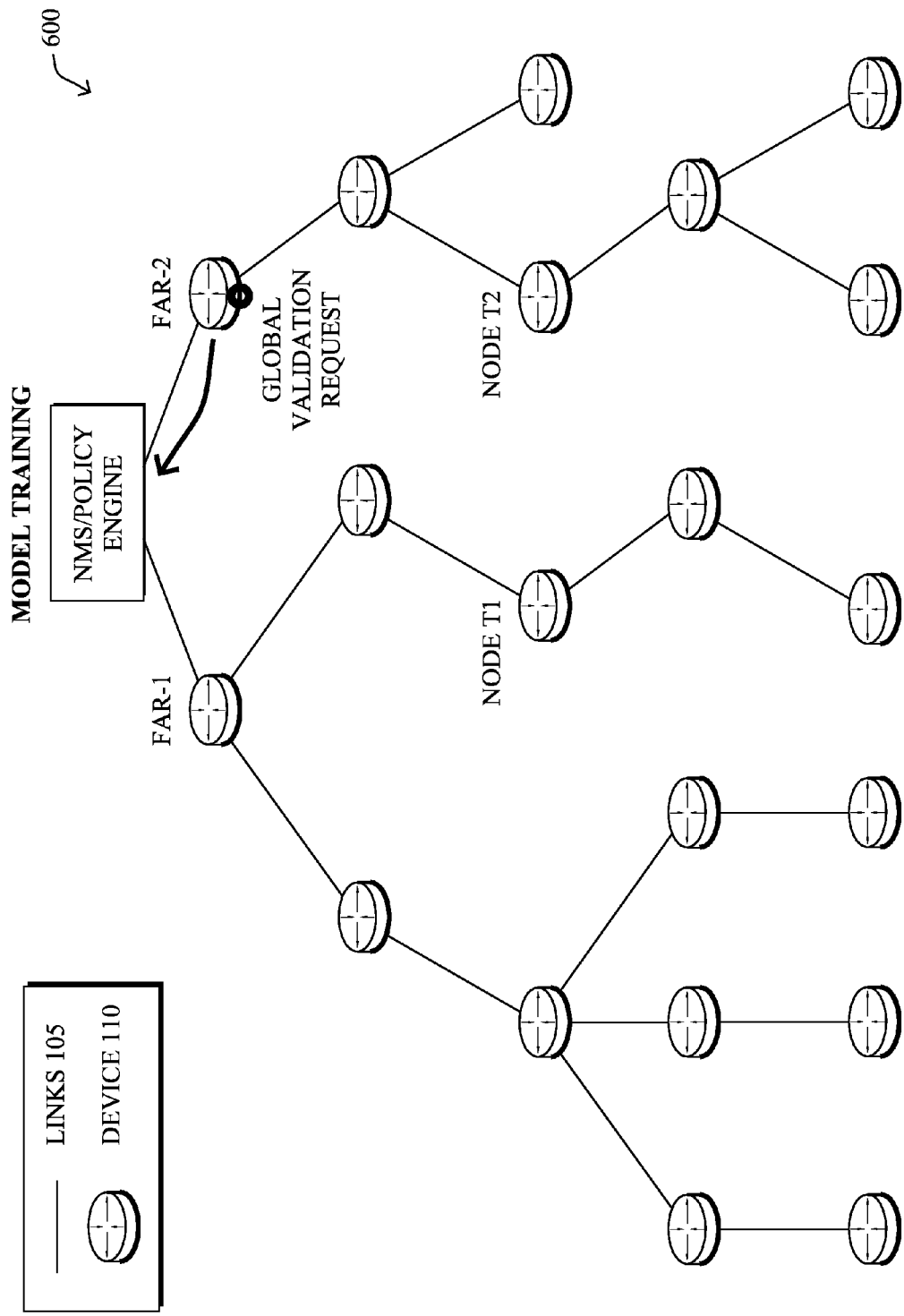
Figure 6M:
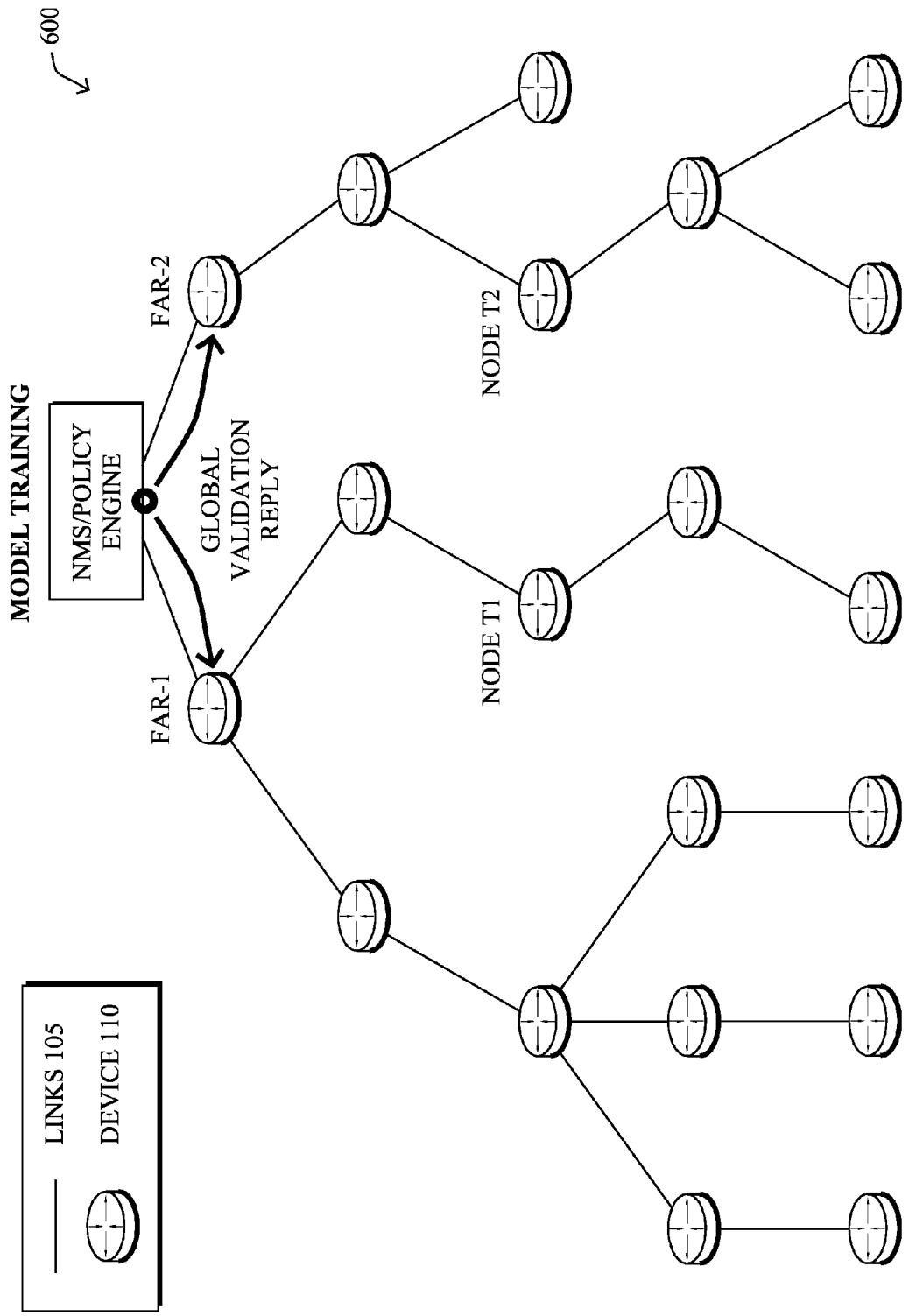
Figure 6N:
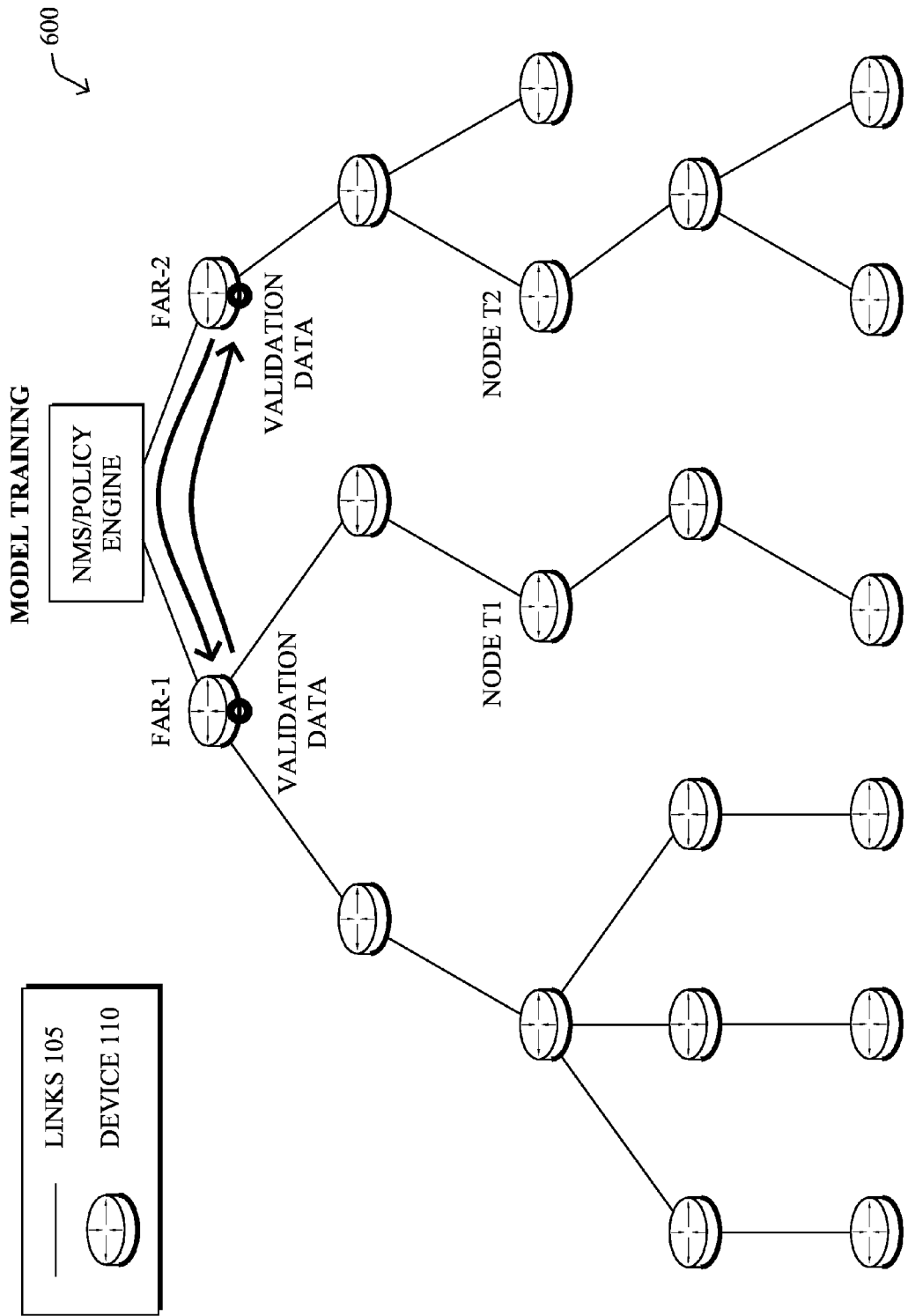
Figure 6O:
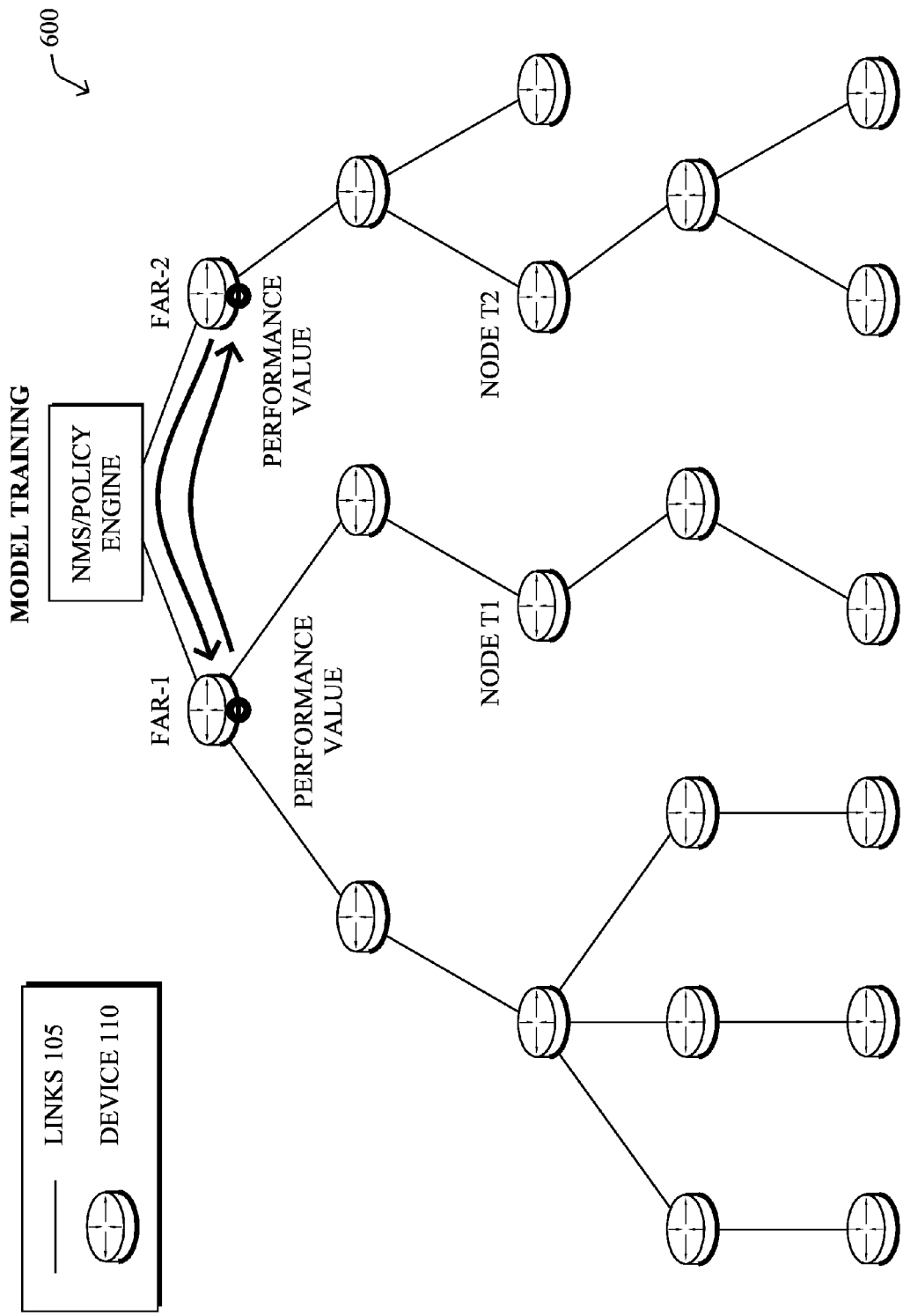
Figure 6P:
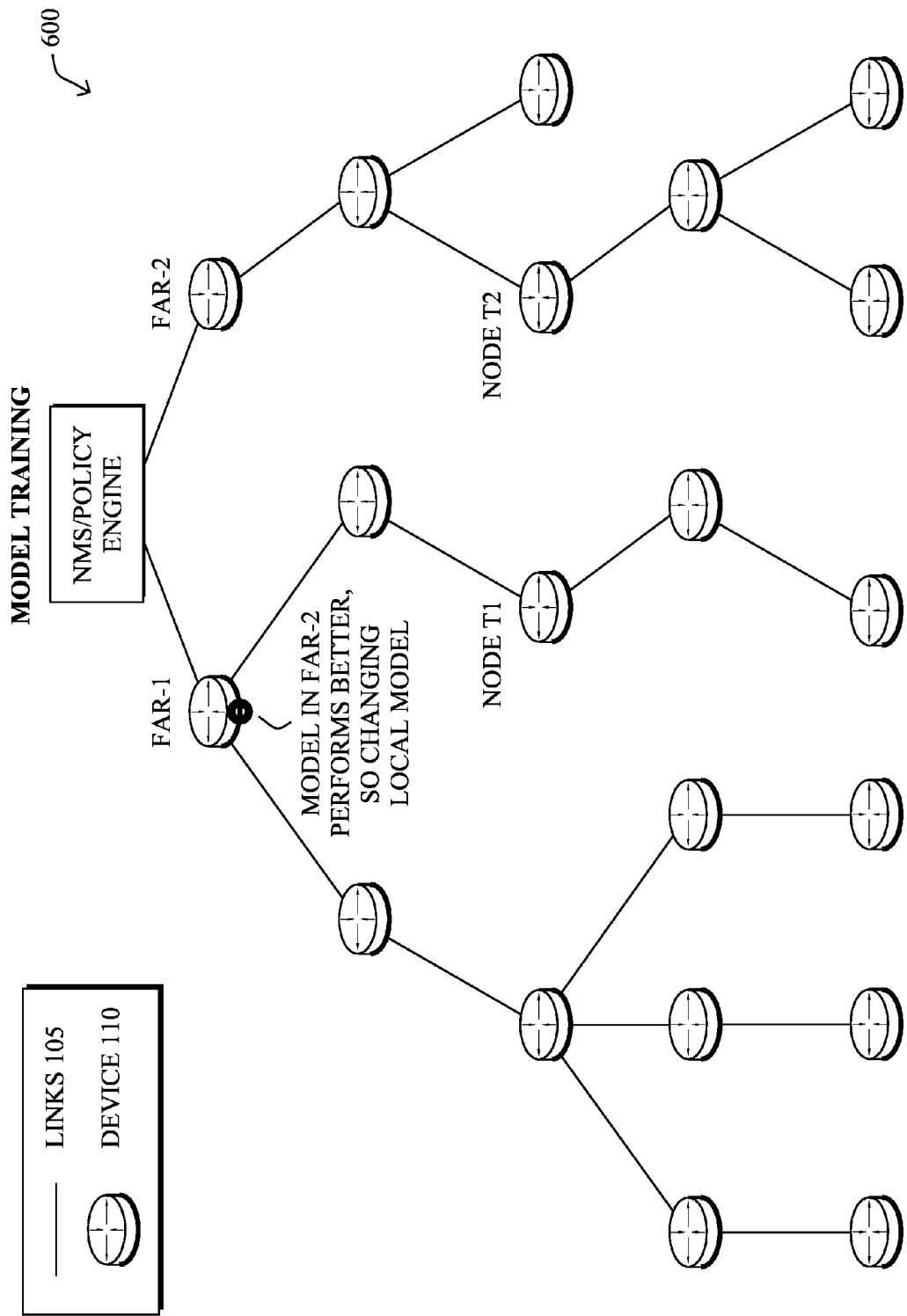
Figure 7A:
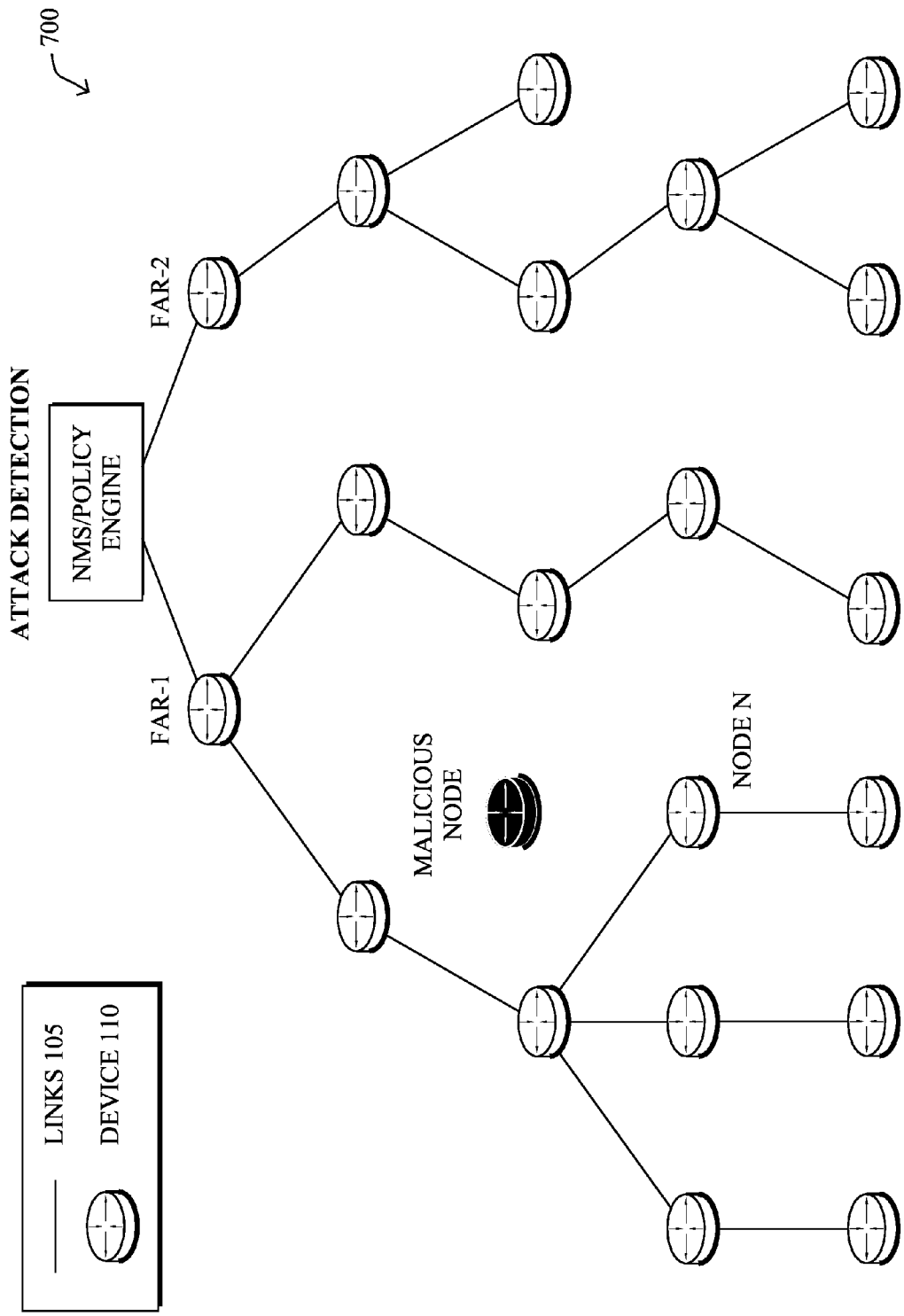
FIGS. 7A-7E illustrate example techniques for using a trained machine learning model to detect a network attack.
Figure 7B:
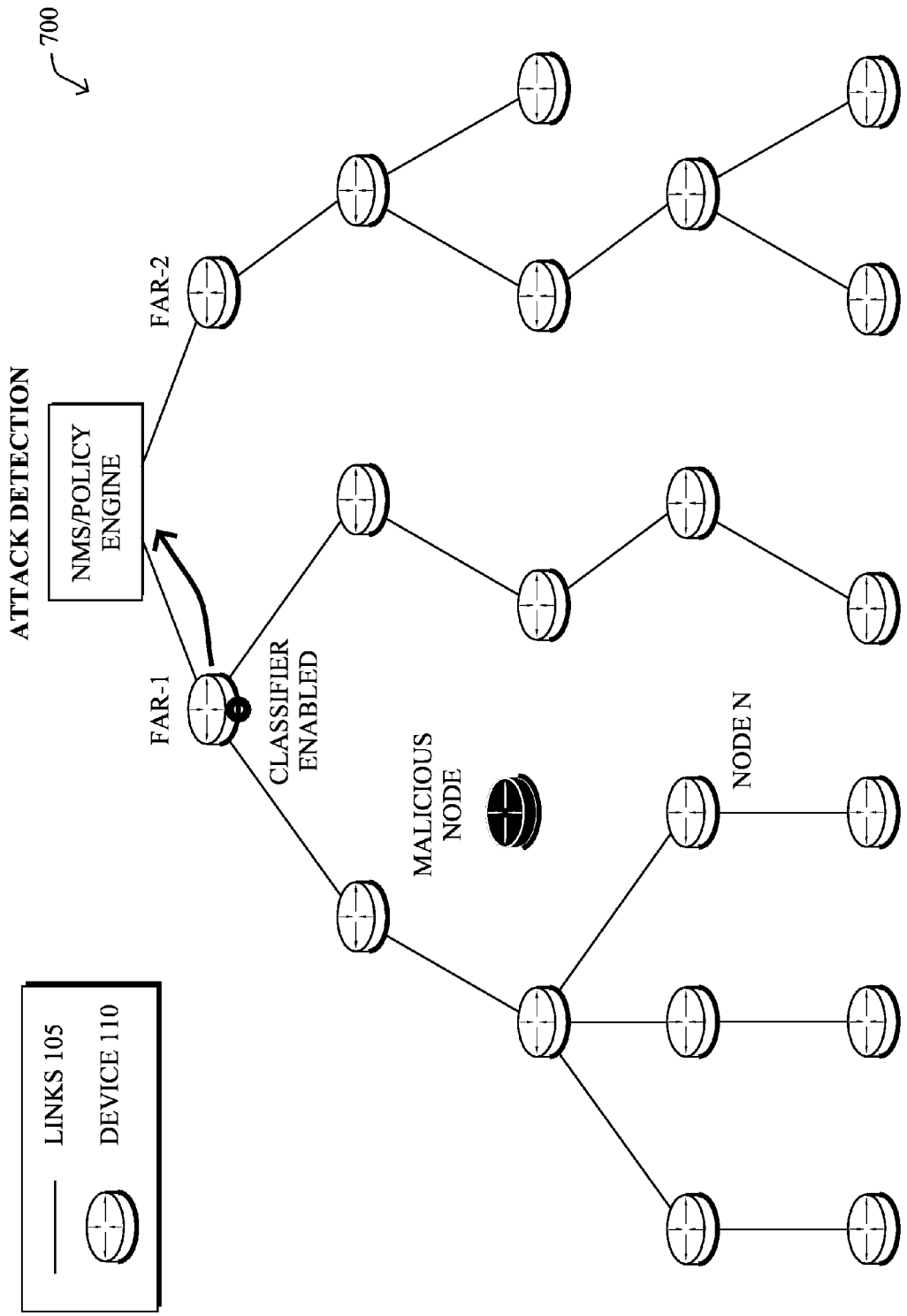
Figure 7C:
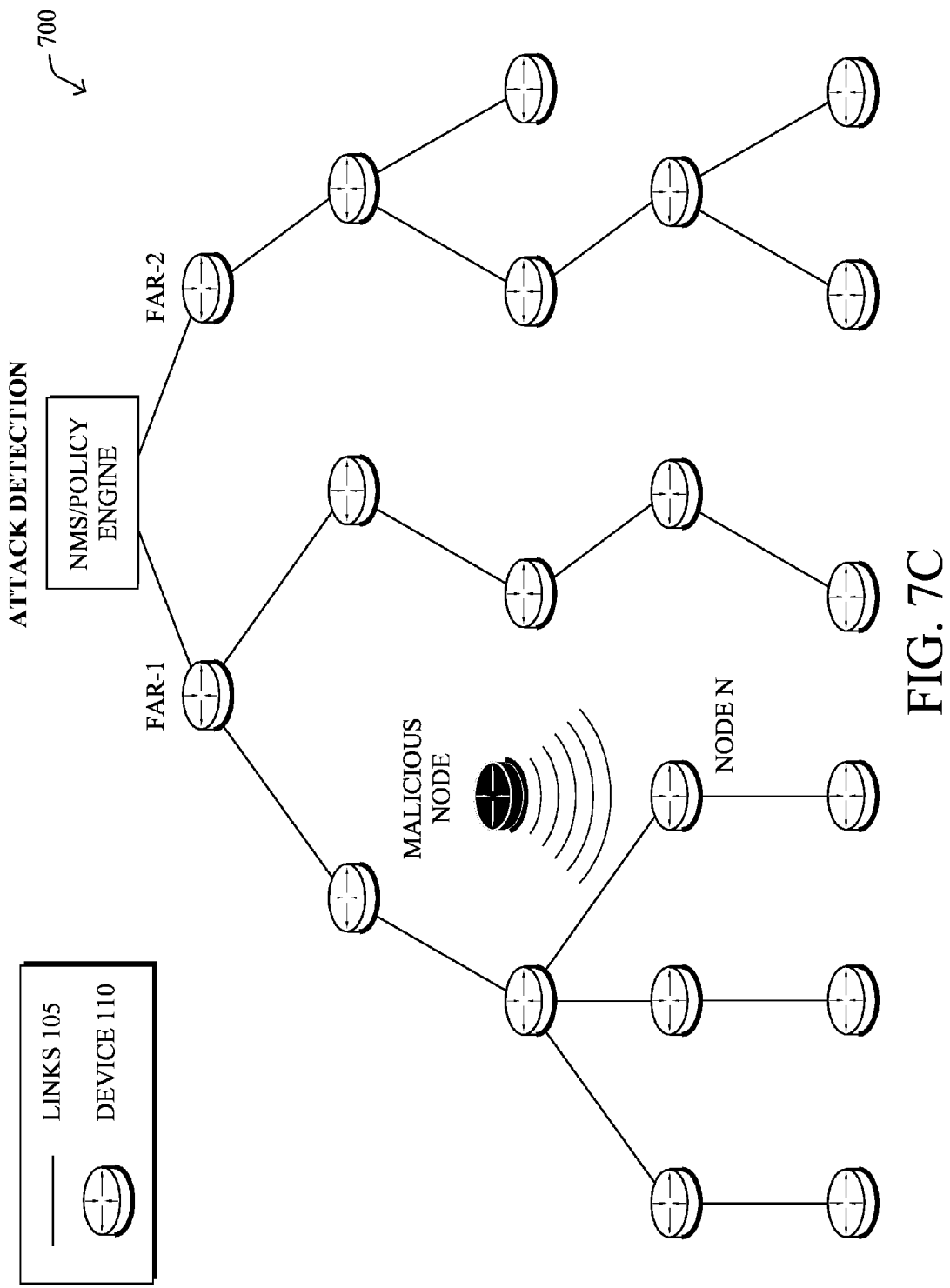
Figure 7D:
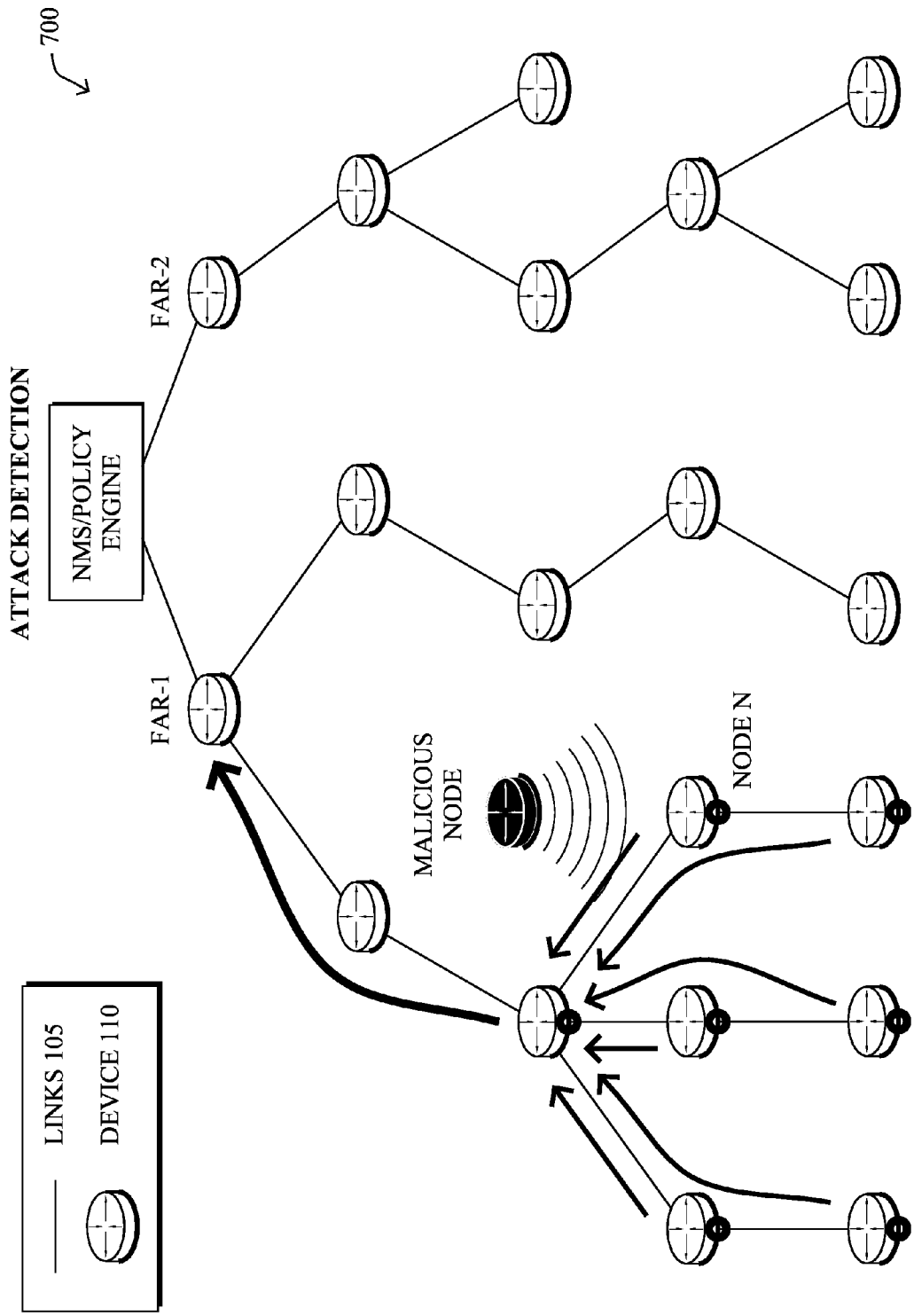
Figure 7E:
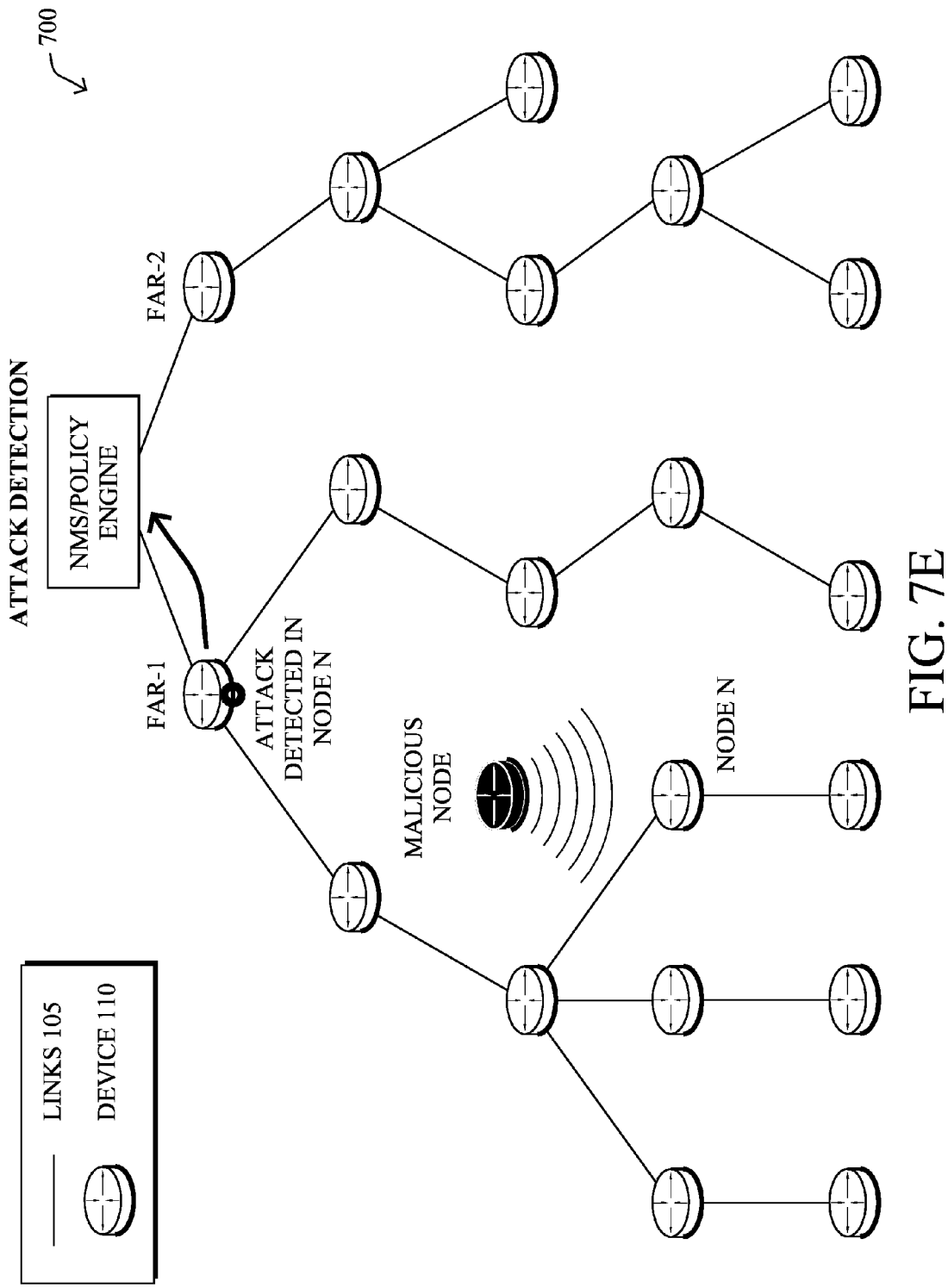

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

RPL supports two modes of operation for maintaining and using Downward routes:

1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams. Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points.

The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely on one or more ML algorithms for performing a task for which they have not been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficient management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

Artificial Neural Networks (ANNs) are a type of machine learning technique whose underlying mathematical models were inspired by the hypothesis that mental activity consists primarily of electrochemical activity between interconnected neurons. ANNs are sets of computational units (neurons) connected by directed weighted links. By combining the operations performed by neurons and the weights applied by their links, ANNs are able to perform highly non-linear operations on their input data.

The interesting aspect of ANNs, though, is not that they can produce highly non-linear outputs of the input. The truly interesting aspect is that ANNs can "learn" to reproduce a predefined behavior through a training process. This capacity of learning has allow the successful application of ANNs to a wide variety of learning problems, such as medical diagnostics, character recognition, data compression, object tracking, autonomous driving of vehicles, biometrics, etc.

Learning in ANNs is treated as an optimization problem where the weights of the links are optimized for minimizing a predefined cost function. This optimization problem is computationally very expensive, due to the high number of parameters to be optimized, but thanks to the backpropagation algorithm, the optimization problem can be performed very efficiently. Indeed, the backpropagation algorithm computes the gradient of the cost function with respect to the weights of the links in only one forward and backward pass throw the ANN. With this gradient, the weights of the ANN that minimize the cost function can be computed.

Denial of service (DoS) is a broad term for any kind of attack aiming at, by any means, making a particular service unavailable (be it a certain application running on a server or network connectivity itself). This is usually performed by bringing the target's resources to exhaustion (again, target resources may range from bandwidth to memory and CPU).

In greater detail, a DoS attack may consist in flooding a target network with hundreds of megabits of traffic (volume based DoS), exhausting a server state by opening a large number of TCP connections (SYN flooding), or by making an HTTP server unavailable by sending it an overwhelming number of requests. An attack may be more subtle and exploit well-known vulnerabilities in the target system (e.g. a large number of fragmented IP packets may exhaust the resources of a router).

Nowadays, DoS attacks are mostly distributed, i.e., they are carried out by multiple sources at the same time, thus making it more difficult to track. In many cases, botnets (i.e. armies or infected hosts spread across the network and under the control of a single master) are used for mounting DoS attacks. In addition, source addresses used for attacks can be spoofed, so that blocking an offending address is potentially useless.

In general, DoS attacks are easy to detect when they are brute-force, but, especially when highly distributed, they may be difficult to distinguish from a flash-crowd (i.e. an overload of the system due to many legitimate users accessing it at the same time).

Statistics and machine learning techniques have been proposed for detecting attacks at the server or network level. Some approaches try to analyze changes in the overall statistical behavior of the network traffic (e.g. the traffic distribution among flow flattens when a DDoS attack based on a number of microflows happens). Other approaches aim at statistically characterizing the normal behaviors of network flows or TCP connections, in order to detect significant deviations.

However, the Internet of Things (IoT) represents a completely different scenario and requires novel detection and reaction strategies. Its highly distributed nature implies that there is no central vantage point from which an attack can be observed. In addition, the scarce resources of the IoT force reporting from the nodes to a central location to be reduced to a minimum.

On top of the lack of global information, detecting DoS in the IoT is made harder by the fact that a much more subtle interference of the network's operations may be enough to bring the network down. For example, a jamming node can prevent a node from decoding traffic by just emitting short bursts when activity on the channel is detected. This can isolate a large portion of the network which uses that node as a parent and cut off a large portion of the network. In addition, in the case of battery operated nodes, a slow but steady flow of malicious traffic can exhaust a node's battery, thus making the node useless in a matter of days.

Due to the high variability of this kind of network, the symptoms of those attacks are not easy to detect and can be lost in the normal noise of the network behavior (traffic peaks and topology changes are quite normal in LLN). Therefore, an intelligent approach is needed that is able to reveal subtle changes in the measured data that are typical of a known anomalous behavior.

—Possible Attacks Against IoT—

Even though the existing literature regarding possible attack types against the IoT is limited, a number of attacks against sensor network technologies may apply with a few minor modifications. Such attacks can be roughly classified into two classes: 1.) insider attacks (i.e., where the malicious node needs to be authenticated and be in possession of the network encryption keys), and 2.) outsider attacks (i.e., where the attacker just needs to be within the radio range of the victims).

In particular, a number of attacks against routing performed by a malicious node in the DAG can be imagined. A node can, for example, perform selective forwarding. In other words, the node could just discard some of the traffic messages that it is asked to forward, while still participating correctly within the routing protocol. Although this can potentially be revealed by end-to-end mechanisms, detection of this type of attack can be difficult and slow due to the low traffic rate and lossiness of IoT networks. Other example attacks include a malicious node impersonating multiple identities or advertising forged routing information, so as to gain a central role in the routing topology.

While attacks belonging to the former class can be prevented through well-designed cryptography and authentication, in the latter case they have to be detected by monitoring the network environment.

The simplest form of attack that can be performed against an RF network is jamming. This consists in artificially creating an interference, so as to prevent message decoding. There are several variations of a jamming attack, with different degrees of complexity and subtlety. The attacker can continuously emit power on the spectrum (continuous jamming), create a collision when it detects activity on the channel (reactive jamming), or attack only a particular type of traffic (selective jamming). The damage from a jamming attack can be maximized if the attacker is able to estimate the centrality of a node in the routing topology. This can be obtained by accounting for the amount of traffic transmitted and received by each node, by leveraging the fact that the link layer addresses are in clear. Once the jammer has detected the most central node, it can try to make this node unreachable for its descendants, which will in turn be forced to select another parent. This can potentially create continuous route oscillations and convergences.

Other kinds of external DoS attacks can be performed by exploiting the fact that a number of messages in the WPAN do not need authentication, such as discovery beacons and some of the EAPoL messages used for authentication. In particular, discovery beacons can be used for injecting false synchronization information into the network, so as to prevent two nodes from meeting on the right unicast communication frequency. EAPoL authentication messages, instead, have to be relayed by the WPAN nodes up to the FAR, and from there until the AAA server. This mechanism allows an attacker to generate routable traffic, thus flooding the network and wasting bandwidth and processing power. A mitigation strategy may to have authentication requests be rate-limited. However this may result in legitimate nodes being prevented from authenticating when an attack is in progress.

Other attacks can be performed against networks that use the 802.11i protocol, which is used for exchanging key information between the authenticating node and the FAR (and therefore, cannot be protected by link layer encryption). Such attacks are documented in the scientific literature and aim at blocking the handshake between the client and the access point. This can be achieved by an attacker by interleaving a forged message between two messages in the handshake. This implicitly resets the handshake state, so that subsequent messages from the authenticating node are discarded.

—Frequency-Hopping and Synchronization in 802.15.4—

In a channel-hopping mesh network, devices communicate using different channels at different times. To communicate a packet, a transmitter-receiver pair must be configured to the same channel during packet transmission. For a transmitter to communicate with a receiver at an arbitrary time in the future, the transmitter and receiver must synchronize to a channel schedule that specifies what channel to communicate on and at what time. Channel schedules may be assigned to each transmitter-receiver pair independently so that neighboring transmitter-receiver pairs can communicate simultaneously on different channels. Such a strategy increases aggregate network capacity for unicast communication but is inefficient for broadcast communication. Alternatively, all devices in a network may synchronize with a single channel schedule such that all devices transmit and receive on the same channel at any time. Such a strategy increases efficiency for broadcast communication since a single transmission can reach an arbitrary number of neighbors, but decreases aggregate network capacity for unicast communication since neighboring individual transmitter-receiver pairs cannot communicate simultaneously without interfering. Mesh networks typically utilize both unicast and broadcast communication. Applications use unicast communication to communicate data to a central server (e.g. AMI meter reads) or configure individual devices from a central server (e.g. AMI meter read schedules). Network control protocols use unicast communication to estimate the quality of a link (e.g. RSSI and ETX), request configuration information (e.g. DHCPv6), and propagate routing information (e.g. RPL DAO messages). Applications use multicast communication for configuring entire groups efficiently (e.g. AMI meter configurations based on meter type), downloading firmware upgrades (e.g. to upgrade AMI meter software to a newer version), and for power outage notification. Network control protocols use multicast communication to discover neighbors (e.g. RPL DIO messages, DHCPv6 advertisements, and IPv6 Neighbor Solicitations) and disseminate routing information (e.g. RPL DIO messages). Existing systems optimize for both unicast and broadcast communication by synchronizing the entire network to the same channel-switching schedule and using a central coordinator to compute and configure channel schedules for each individual device, or else more efficiently optimizing for both unicast and broadcast communication in a channel-hopping network without need for centrally computing schedules for individual nodes.

In order to join the WPAN enabled with frequency hopping (e.g., an 802.15.4 WPAN), a node needs to synchronize on the frequency hopping schedule of its neighbors. Therefore, each node in the WPAN broadcasts its unicast reception schedule via a discovery beacon, which is not encrypted and sent on every frequency: this allows nodes joining the PAN to join. In greater detail, the discovery beacon message is sent a broadcast destination WPAN and includes several information elements, most notably:

The WPAN SSID string

The unicast scheduling information. In one implementation, this is made up of a slot number and an offset value. This allows the receiving node to compute the slot number the sending node is currently is, and thus, by applying a hash function, to know its current receiving frequency. Note that this algorithm does not require the clocks of the two nodes to be synchronized.

The transmission of a discovery beacon is triggered by an associated trickle timer. However, the information about the scheduling of the broadcast slot is not included in such a beacon, but only in the synchronous and unicast beacons, which are encrypted with the network key. In particular, the synchronous beacon is triggered by a trickle timer and it is sent on every frequency (just as the discovery beacon). The unicast beacon, on the contrary, is sent upon request by another node by using a standard unicast transmission. In both cases, the beacon includes a broadcast scheduling information element, which has the same format of the unicast scheduling IE (Information Element). As a consequence, an attacker can interfere with its target during its unicast slot, but ignores the broadcast frequency schedule: the broadcast schedule is therefore much better protected against DoS attacks.

—802.15.4 Security—

Currently, IoT architecture comes with several embedded security mechanisms. The cornerstone of IoT security is indeed link layer encryption, which is mandatory for most frames (including routing messages and application traffic). Besides pure encryption, link layer security ensures message integrity (through an encrypted MAC code) and message non-replication (through an encrypted sequence number included in the encrypted message payload).

In order to install the necessary link layer keys on every node, an authentication procedure is carried out when the node joins the network. Such a procedure is based on the EAPOL protocol, which is carried directly over layer 2 messages and is used for transporting authentication data from the node to the FAR (notice that such messages are not encrypted). On top of EAPOL, two main protocols are carried: EAP messages, which the FAR tunnels to an AAA server through the RADIUS and 802.11i messages, which are used for exchanging cryptographic material between the FAR and the node.

In greater detail, EAP messages are used by the node for mutual authentication with the AAA server and securely agree on a shared secret; to this end, a complete TLS handshake is, in turn, tunneled over EAP messages and a public key mechanism based on X509 certificates is used for identity validation. Once such shared secret has been established, the AAA server transmits it to the FAR, which, in turn, uses it for exchanging the link layer keys with the node through the 802.11i protocol.

Notice that the shared secret negotiated through EAP is stored by the node in persistent memory and can be reused for subsequent authentication (in this case, EAP is skipped and the link layer key is directly exchanged through 802.11i).

Feature Aggregation in a Computer Network

Simplified examples of techniques for using a learning machine (LM) in a computer network are shown in FIGS. 4A-7E, according to various embodiments. In FIGS. 4A-4G, a network node/device (e.g., FAR-1 executing a first machine learning model) may initiate the collection of feature data used as inputs to the model. In some embodiments, one or more network attacks may be simulated to generate the collected data (e.g., if the model is to detect a network attack), as shown in the examples of FIGS. 5A-5F. In FIGS. 6A-6P, various techniques are shown to train the learning machine. Finally, as shown in FIGS. 7A-7E, a trained machine learning model may be used within the network, for example, to detect a network attack.

In general, the techniques herein specify a mechanism that dynamically adjusts the sending of information required by an LM hosted in the network, according to the network congestion and learning machine state (e.g., using a closed-loop feedback mechanism). In some aspects, the techniques herein prevent the network from being flooded by messages carrying features, which would prevent the learning machine from being operational and could by itself be a sophisticated form of attack against the learning network. First, detection of congestion generated by feature messages is performed both locally and on an end-to-end basis, as illustrated generally in FIGS. 4E-4F. Then, aggregating nodes are chosen based on the feature relevance to the LM, on the overall feature traffic rate and on the nodes' capabilities, as illustrated generally in FIG. 4G. Once aggregation has been set up, both the traffic rate and the LM performance are monitored by the LM, allowing the aggregation parameters to be adjusted dynamically (e.g., via a closed loop control mechanism, etc.).

Typically, data aggregation in the networking context involves distributed aggregation trees for monitoring IP networks, which build an overlay network of probes on top of a distributed hash table. In order to make the amount of exported data constant at each level of the tree, probabilistic data structures can be used in order to summarize the observed data in a compact and easy-to-aggregate format. However, such mechanisms are meant to work without a central controller, i.e., the nodes responsible for aggregation cannot be chosen adaptively. Aggregation strategies associated with network topologies such as DAGs are also possible in sensor networks. However, in this case, aggregation is applied to application level data (i.e., network or user data information used by the LM) instead of security and monitoring messages. In addition, such mechanisms are in general not adaptive and rely on a fixed aggregation function.

According to various embodiments, the techniques herein provide a mechanism designed for the specific case of aggregating information (called Monitoring information) used by a ML classifier to detect an event, such as DDoS network attack. In contrast with other approaches to aggregate information in a network, the disclosed techniques provide for closed-loop control, thereby allowing the application mechanisms to be dynamically adapted based on the network state, in order to avoid congestion in the network. Furthermore, the techniques herein diversify the aggregation level of the different features according to their relevance to the LM computation and stop or decrease aggregation whenever network conditions allow transmitting more feature specific traffic without congesting the network.

Specifically, according to one or more embodiments of the disclosure, a device determines that input data to a machine learning model sent from a plurality of source nodes to an aggregation node is causing network congestion. A set of one or more other nodes to perform aggregation of the machine learning model input data is selected. A type of aggregation to be performed by the set of one or more other nodes is also selected. The set of one or more other nodes is also instructed to perform the selected type of aggregation on the data sent from the source nodes.

Operationally, the techniques described herein present a control infrastructure for feature aggregation, which may be both adaptive and feedback based. These techniques include various aspects, such as local and remote detection of congestion created by feature messages, selecting nodes for performing feature aggregation, and continuously tracking and tuning the aggregation procedure. As used henceforth, the term "feature messages" generally refers to the messages sent by collection nodes to the LM node (e.g., the node that executes an ANN-based classifier) that include the features.

In a first aspect, the techniques herein provide a methodology for detecting an overload of feature related messages in a network. This is straightforward in cases in which the congestion happens in the LM node/device (e.g., the LM receives more data than it can process). In this case, the LM itself will be aware of the congestion. For example, such a situation may occur in LLNs where the router hosting the LM has limited CPU power (e.g., an ARM-based microcontroller) or in a high-speed network (e.g., a switching network) where the bottleneck is not the network bandwidth but the CPU on a low-end switch. Furthermore, if the emission of too many messages by the end nodes is causing collisions elsewhere in the network, this will not be detected by the central controller that will, on the contrary, be under-loaded (i.e., will receive a few messages, since most of the packets are lost in the network because of collision).

In one embodiment, each of the nodes in the network may continuously monitor the transmission success rate of the feature messages (e.g., this can at least be estimated by using layer-2 acknowledgements). Although a low success rate can also be caused by a change in the physical channel, consistency between link-layer and physical layer statistics can be leveraged in order to distinguish between the two cases. In particular, the techniques herein specify two local 'feature-based congestion' detection mechanisms on a node:

- The node can detect congestion on the upstream link and trigger aggregation as soon as the number of non-acknowledged transmission messages crosses a configurable threshold. This will also work in the case where monitoring messages are not too many 'per se', but there is already a significant amount of traffic flowing through the link,
- The node can also track the data rate associated with monitoring messages and trigger aggregation as soon as it trespasses a certain percentage of the link bandwidth. This can ideally prevent congestion, even though it may lead to conservative choices (e.g., begin aggregating data when there is still spare bandwidth on the channel).
- Note that such thresholds may be dynamically adapted according to local condition (e.g., when the low power link bandwidth is dynamically reduced in the network).

Once the success rate for the feature message traffic drops below a given threshold, the node reports this state to the central controller (i.e., the LM hosted in the router, such as a FAR). Since the network is in this case very congested, an end-to-end handshake between such controller and the node may be used for ensuring reliable delivery. In one embodiment, the techniques herein specify a newly defined unicast IPv6 message, which can be of the form of a CoAP message sent to the CoAP agent co-located with the LM. Alternatively such a notification may be piggybacked in the routing protocol using a newly defined router metric/state information carried in a RPL DAO message or an OSPF Router LSA.

Congestion detection may also be performed by the controller on an end-to-end basis. In particular, each end node may insert in its feature messages a sequence number specified as a newly defined IPv6 hop-by-end option. This can be used by the controller for performing two tasks: 1.) detecting losses in order to reveal congestion (i.e., thus the impossibility to send the required features and 2.) estimating the traffic rate generated by each end node, in order to optimize the aggregation strategy.

The two mechanisms for detecting congestion detailed above are often complementary. For example, in the case of severe congestion, none of the messages from one node may make it to the controller running the classifier and the sequence number mechanism may not work, while the link-local mechanism will certainly detect it. By mapping the information inferred from the sequence number on the routing topology, the controller is able to estimate the amount of monitoring traffic flowing through every node in the network, through simple passive monitoring.

In a second aspect, the techniques herein provide a methodology for selecting the nodes to perform the feature aggregation. The task of selecting which nodes will perform aggregation will illustratively fall on the central controller, such as the FAR executing the LM. Once it has been notified that a feature exporting mechanism is creating network congestion, the controller selects a subset of nodes that will be responsible for aggregating the exported information.

In various embodiments, the configuration of the aggregation infrastructure is not limited to a single parameter, but may involve the choice of a number of options such as the features to be aggregated, the aggregation function, and/or the set of nodes performing aggregation. In particular, as for the features to be compressed, their selection may be driven by the LM itself since some of the features may be less significant to the correct output of the detector. The way those features are isolated is specific to the particular learning machine (e.g., in case of a neural network, the weight assigned to a particular feature in the first layer is a good indicator of its relevance). When using a correlation function such as VBLS (linear or nonlinear), weight associated to each relevant features can also be used.

In turn, the specific nature and weight of the features makes them compatible with different possible aggregation methods. In particular, low weight features can be filtered (e.g., only one in N samples can will be exported) or averaged (only the average value of N points is extracted). Features that are locally uniform can be aggregated by the parent nodes serving a particular physical area. For example, the node density perceived by a number of closely packed nodes will be roughly the same and can be averaged by their parent.

The techniques herein thus dynamically select the node and the type of aggregation to be performed (e.g., filter the feature data, send the data less frequently, send the data more frequently, etc.). Various aggregation strategies can be used by this control method, such as any of the following or the strategies discussed previously:

- Data quantization (i.e., a feature space is split is a small number of bins, so that the value can be expressed as the bin index).
- Differential encoding (i.e., only the differences among data points are reported, minor differences are rounded to zero and not exported).
- Averaging consecutive samples.
- Batching (e.g., bundling consecutive statistics in the same message to reduce the overhead of packet headers.
- Sampling (i.e., statistics are buffered and only one in N is transmitted).
- Finer-grain classification (e.g., cascaded classifiers with different performance features can be used at different locations in the network). In particular, an intermediate classifier between a weak classifier on the end node and a strong classifier on the router can be used for intermediate data reduction.

Regarding node selection for aggregation of features message, the controller has to ensure that aggregator has enough resources available to fulfill the role of aggregator (e.g., nodes running on batteries or with limited hardware resources should not be chosen as a rule). In addition, the set of the selected nodes has to be chosen so as to guarantee that the aggregated rate of the traffic flowing through the congested nodes will be lower than a certain threshold (this effectively eliminating congestion). Consequently, aggregation node selection may be based on the routing topology, link layer information (e.g., using the available bandwidth data contained in this information), the traffic matrix, and/or the nodes' attributes (e.g., obtained from node metrics). In some embodiments, aggregation can be performed on the nodes themselves that are generating the feature messages (e.g., as in the case of message filtering).

Optionally, the compression/aggregation function can be applied only to the traffic coming from a subset of nodes. This can be configured in case a few nodes have been attacked previously, and need to be tracked in greater detail.

Once the optimization has been carried out and both the aggregation mechanism and the aggregating nodes have been chosen, the controller may, in one embodiment, send to the selected nodes a newly defined IPv6 unicast message containing any or all of the following TLVs:

The aggregation function, along with its corresponding parameters;

The feature to be aggregated; and

An optional list of addresses to be filtered.

In another embodiment, a single message may be sent to multiple nodes should the same aggregation policy apply, in which case the message will be broadcasted and may carry a bloom filter or other compression structure encoding the set of destined nodes.

In turn, the node performing aggregation, in case it is aggregating traffic coming from different sources, will include in the message the aggregated data, the source nodes (e.g., encoded in the form of a bloom filter), together with their corresponding sequence number. In case the aggregation strategy requires suppressing some of the messages, the highest sequence number has to be reported, so that this information can be used for computing the source data rate.

According to various embodiments, a third aspect of the techniques herein provide a closed-loop control mechanism that allows for monitoring and dynamically adjusting feature aggregation in the network. In one embodiment, the closed-loop control is performed by the controller running the ANN or other LM-based classifiers. This will continuously monitor the following information sources:

The estimated traffic rate for each data source (e.g., by using the sequence numbers in the feature messages). If such data rate drops below its pre-congestion level, the root cause of the congestion may have disappeared and aggregation may be no longer needed or tuned less aggressively (e.g. an attack or an anomaly have ended).

The performance of the LM. In particular, poor performance may indicate that a too aggressive data reduction strategy has been adopted. Indeed, too much aggregation of the data can cause a loss of information on the reported features that can generate a drop of the performance of the LM. For the particular problem of detection of attacks using LMs, the control of this performance for assuring that the level of aggregation does not generate a critical loss of information can be done by using a mechanism whereby a subset of nodes in the network can be used for generating a controlled attack. This can be used as a background truth for assessing the performance of the LM. More specifically, the LM can try to detect this attack and, if its detection performance is consistent with the standard performance of the LM, the impact of aggregation is acceptable. On the contrary, if a significant drop in the performance of the LM is observed, this can be an indicator of an excessive level of aggregation.

Any intermediate nodes are also themselves involved in the control loop. Once they detect a significant drop in the rate of the traffic they are forwarding, they will signal the ANN/LM controller.

In general, the performance (e.g., in terms of information reduction and output traffic rate) of most of the aggregation mechanisms depends on a few fine-tuning parameters (e.g., the sampling rate or the time window for averaging). The closed-loop control mechanism will tune those parameters according to the information provided by the three sources of information mentioned above.

Figure 8A:
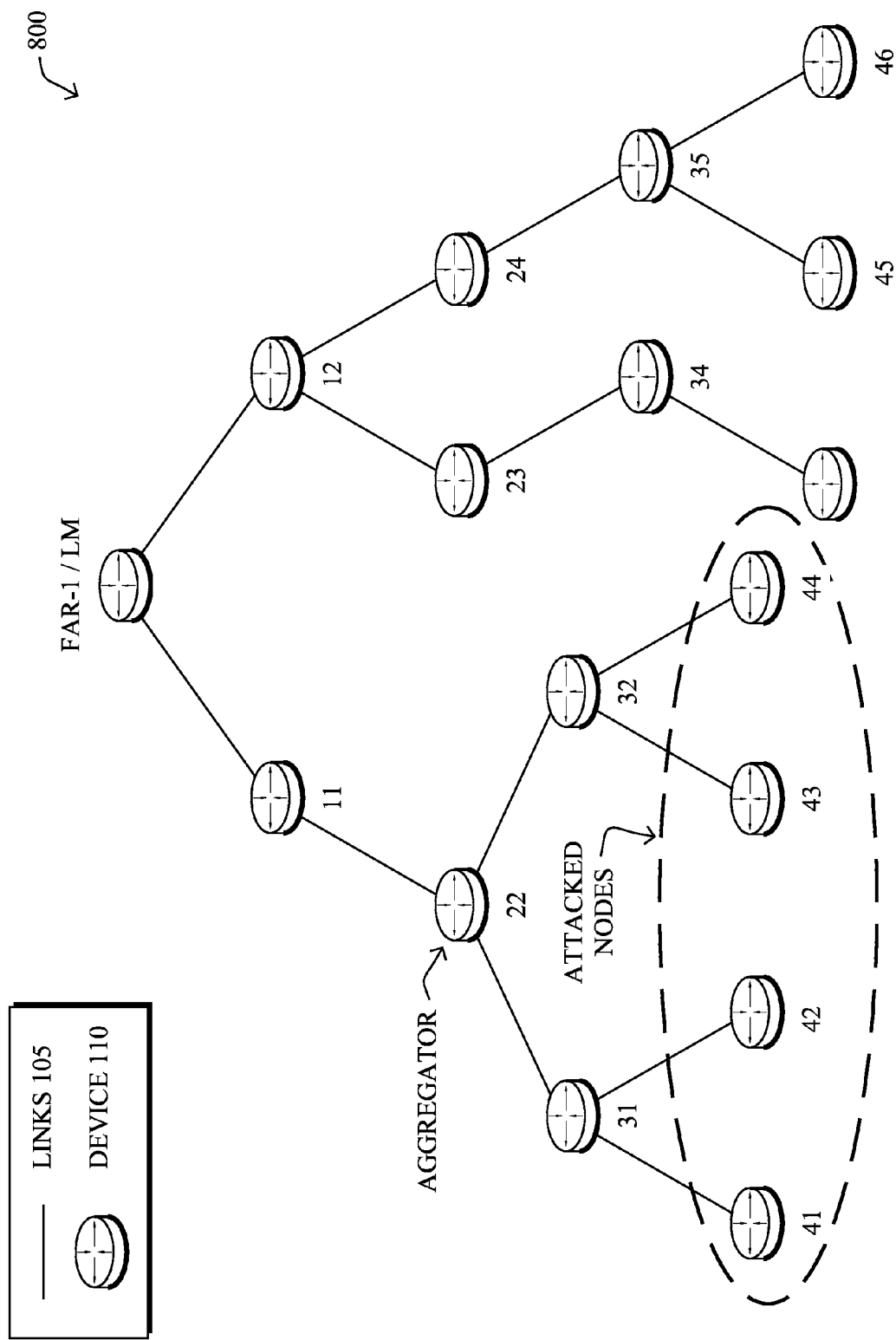
Figure 8B:
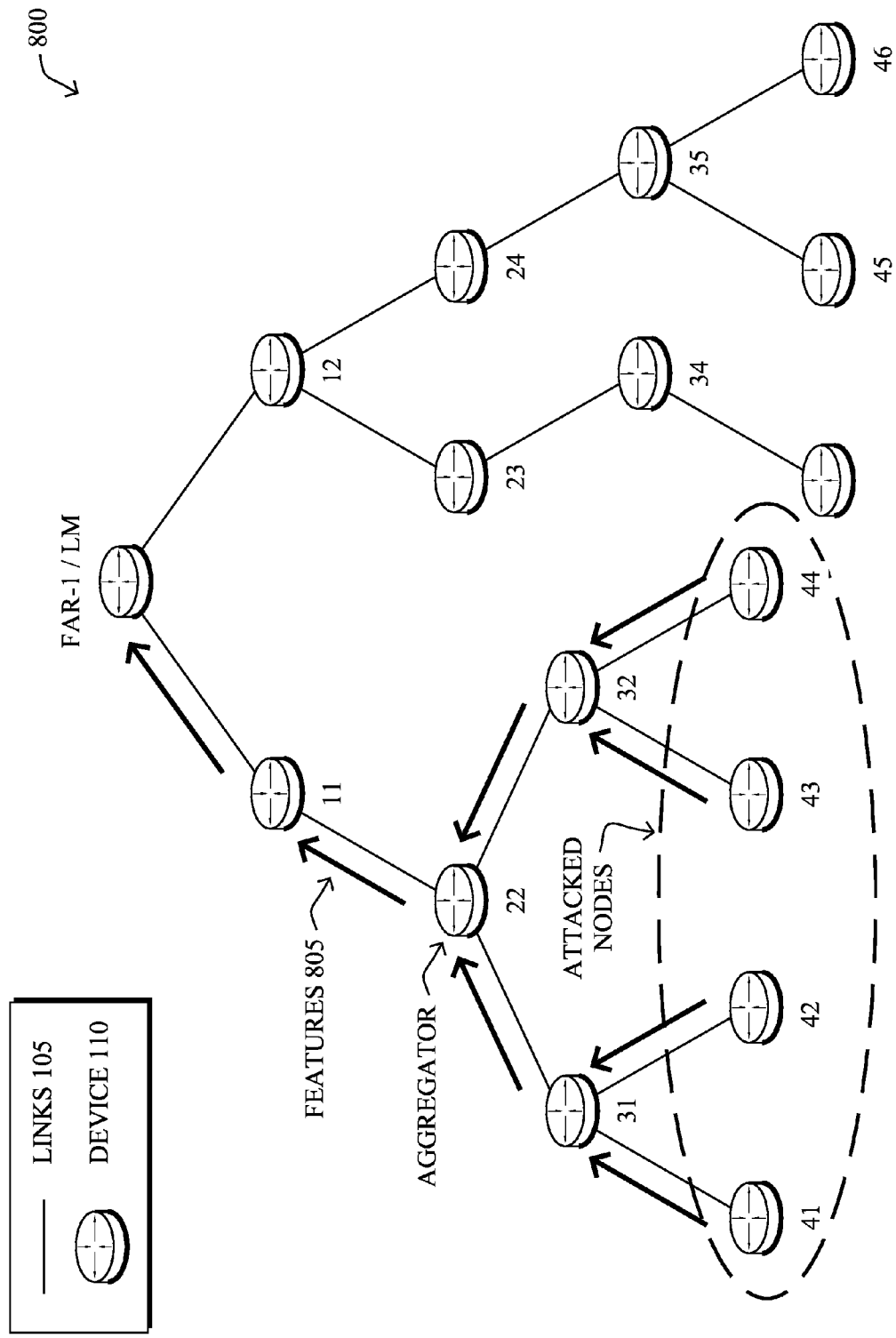
Figure 8C:
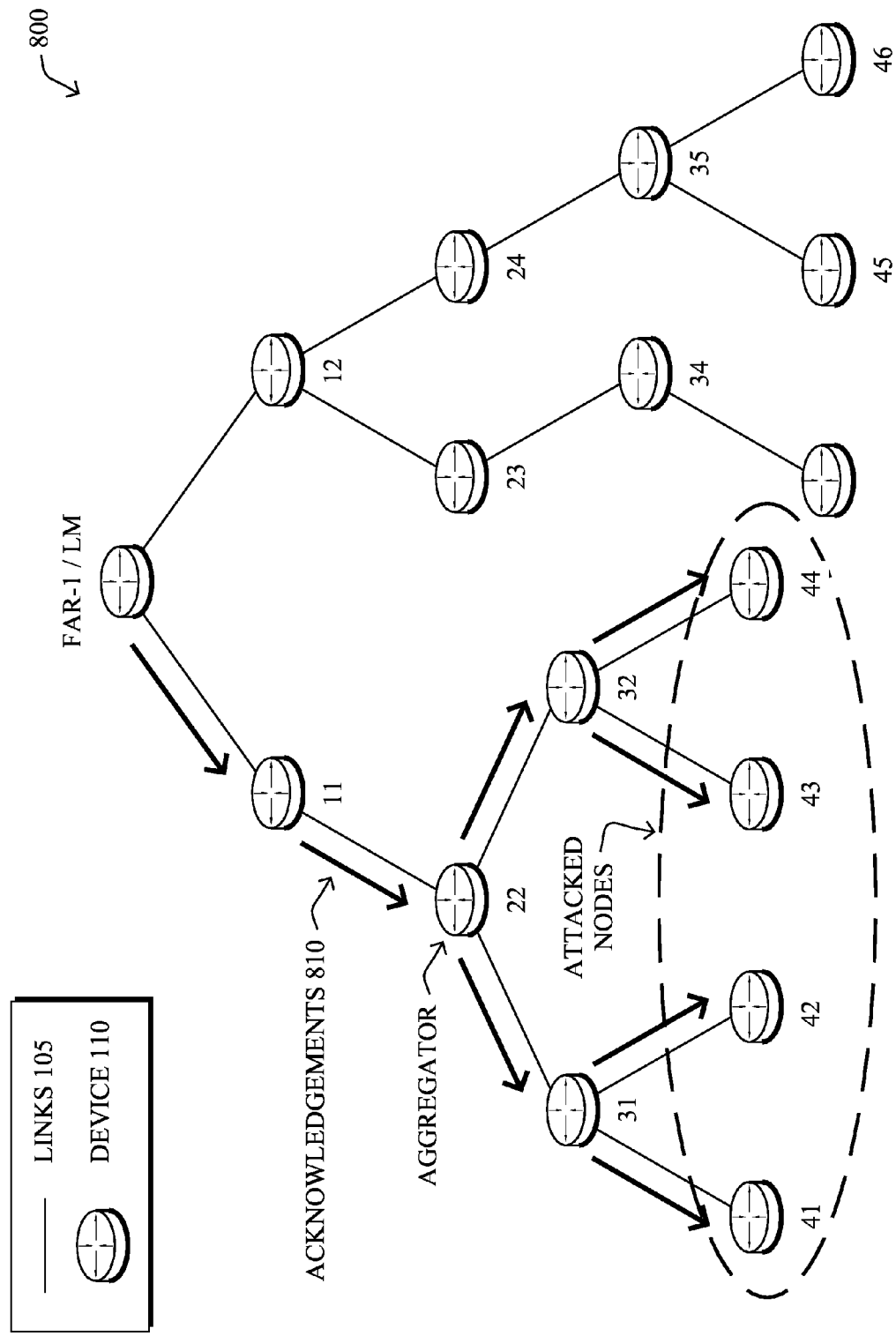
Figure 8D:
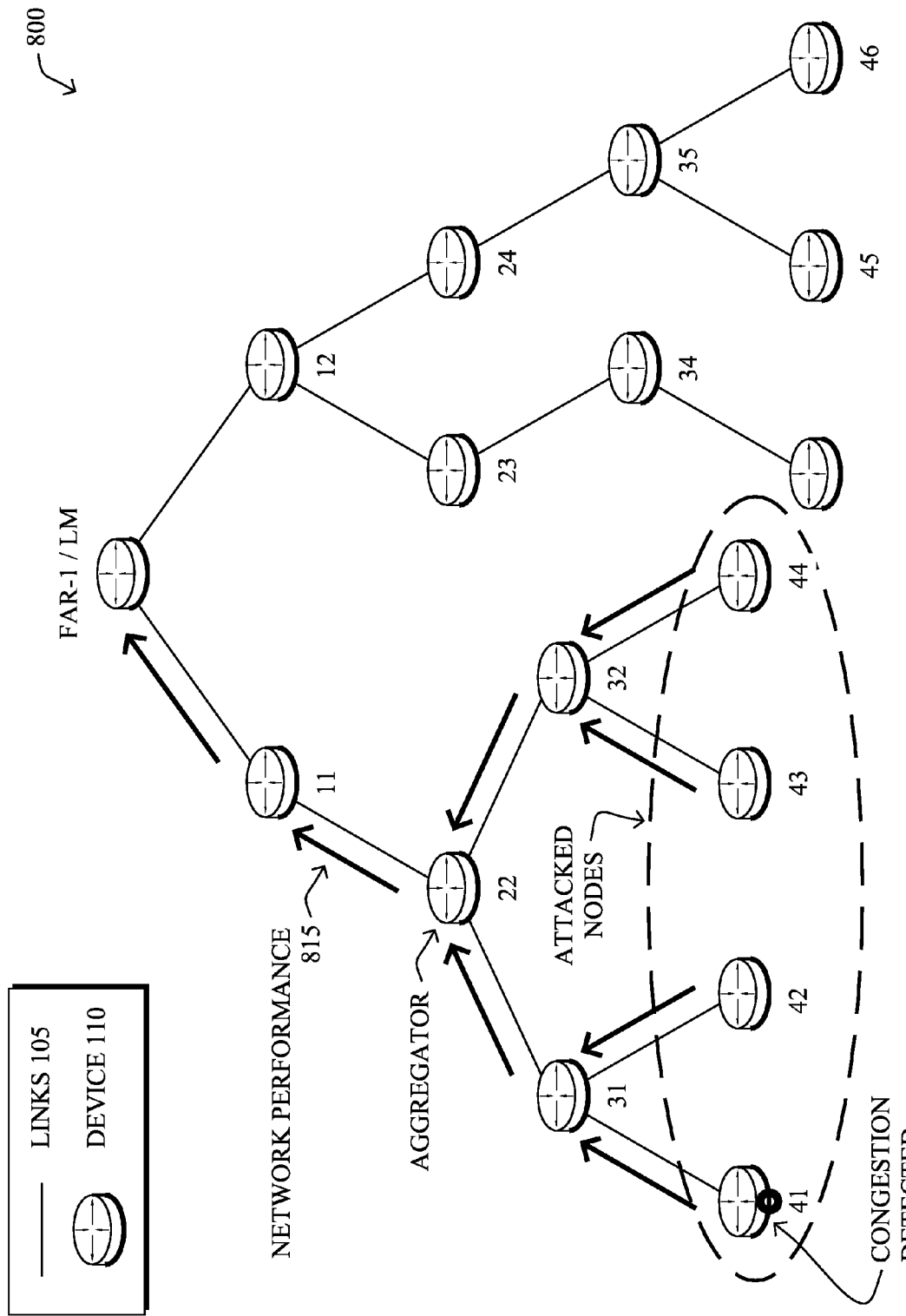

For the sake of example, assume in FIGS. 8A-8E that nodes 41, 42, 43, 44 are targeted by an attacker which is trying to trigger a feature message overflow in the network. The local classifiers of nodes 41-44, if present, will then start issuing positives and a number of statistic messages will begin flowing towards FAR-1. In the absence of a local classifier, the features 805 may be systematically sent by the local nodes to FAR-1, as shown in FIG. 8B. This will, in turn, trigger a number of collisions among nodes trying to transmit to node 22. As shown in FIGS. 8C-8D, acknowledgements 810 may be sent back to a sending node, allowing each node to determine its own successful transmission rate (e.g., node 22 may send a layer-2 ACK message to node 42 acknowledging the receipt of feature data). Due to the collisions among notes trying to transmit to node 22, nodes 31, 32 will then experience a very low successful transmission rate. Such a condition may be detected by the nodes and will notify FAR-1 hosting the LM. For example, detected congestion may be provided to FAR-1 as part of network performance data 815. In the meantime, FAR-1 may be monitoring the sequence numbers associated with the attacked nodes, to make its own determination as to whether or not congestion exists. Based on the detected network congestion, FAR-1 will then decide to perform aggregation on nodes 31 and 32. Assume now that the following statistics are being used for detection: node density, successful transmission rate, successful reception rate, and RSSI. FAR-1 will then send an aggregation instruction 820 to node 22. Such a message may specify the following:

The data density will be averaged on node 22. This is a locally uniform feature and has a minor impact on the LM. For example, if only one out of two values is exported, this will have a considerable impact by aggregating the data.

The successful transmission rate and RSSI are to be sampled and one in four data points are to be provided. Doing so, therefore, reduces the information rate.

The successful reception rate is considered crucial and all of its samples are exported.

This should grant a 50% reduction in the data rate at node 22, which should keep the congestion at an acceptable rate.

Once the attack is over the attacked nodes 41-44 will issue much fewer feature messages being sent as a consequence. This will be detected both by the FAR-1/LM (e.g., by looking at the sequence numbers) and by nodes 31, 32 (e.g., which will receive considerably lower amount of traffic). The FAR, in turn, will make aggregation less aggressive (e.g. by setting the sampling rate to ½, which would make the traffic at node 22 75% of the original traffic rate). If, even after such tuning, there is no perceived congestion then the aggregation mechanism is disabled.

Figure 9:
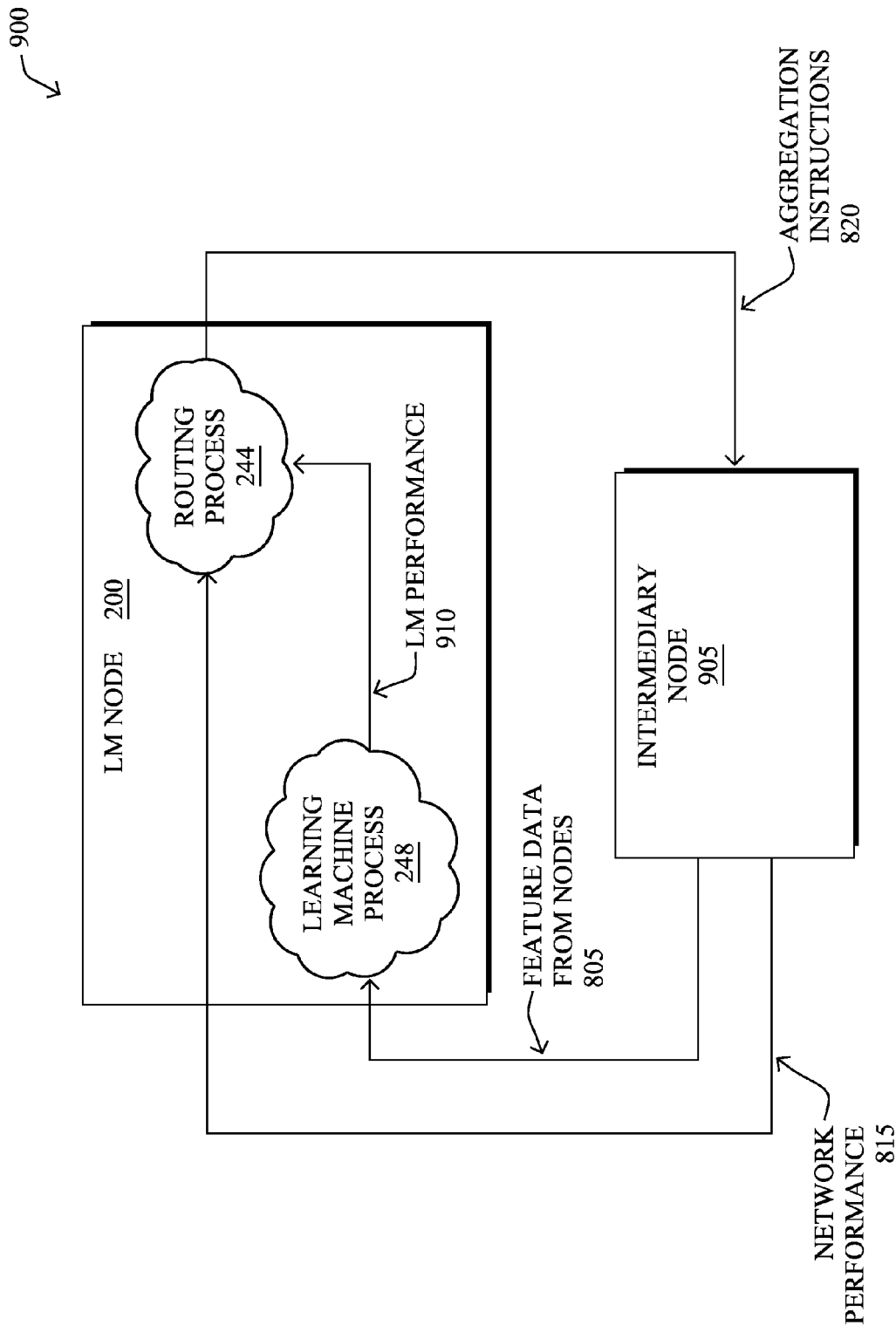
FIG. 9 illustrates an example closed-loop feedback mechanism for adjusting the aggregation of feature data in a network.

FIG. 9 illustrates an example closed-loop feedback mechanism for adjusting the aggregation of feature data in a network. As shown, a network node 200 that executes an LM may operate in a closed-feedback manner to provide aggregation control over an intermediary node 905 (i.e., a node located in the network between the source of feature data and node 200). As shown, intermediary node 905 may provide data to LM node 200, such as the feature data 805 generated by the source node(s). For example, features generated by nodes near a point of attack may report the corresponding feature data to LM node 200. Alternatively, the attacked nodes may instead assess the features (e.g., using their own LMs), and report the detection of an attack to LM node 200. LM node 200 may generate performance data 910 regarding the performance of LM 248. For example, performance data 910 may indicate poor model performance due to too little feature data arriving at LM 248 (e.g., due to collisions) or too much feature data (e.g., causing LM 248 to become overloaded).

Additional input data to LM node 200 may include network performance data 815. Network performance data 815 may contain data regarding the transmission of data to LM node 200 from the various network nodes. For example, network performance data 815 may indicate the bandwidth usage, successful transmission rate, etc. of the nodes to LM node 200. In one embodiment, network performance data 815 may include an indication that one of the nodes has determined that it is experiencing network congestion. For example, if a particular node's successful transmission rate falls below a threshold amount, that node may notify LM node 200 of the condition.

Routing process 244 may receive LM performance data 910 and/or network performance 815 and use the data to generate aggregation instructions 820. In general, aggregation instructions 820 may include instructions regarding which node or nodes are to perform aggregation, which feature or features are to be aggregated, the type of aggregation to be performed, and/or which source nodes' data is to be aggregated. For example, LM node 200 may instruct intermediary node 905 to begin aggregating feature data from two source nodes by averaging the nodes.

In various embodiments, the operations of LM nodes 200 and intermediary node 905 are performed as part of a control loop. For example, aggregation instructions 820 may affect what feature data 805 is provided to LM node which, in turn, may affect the performance data 910 for the LM. Thus, LM node 200 may adaptively control how intermediary node 905 performs aggregation. In some embodiments, LM node 200 may further select which intermediary nodes, if any, are to perform feature aggregation. For example, LM node 200 may select a different node from that of intermediary node 905 to aggregate the feature data.

Figure 10:
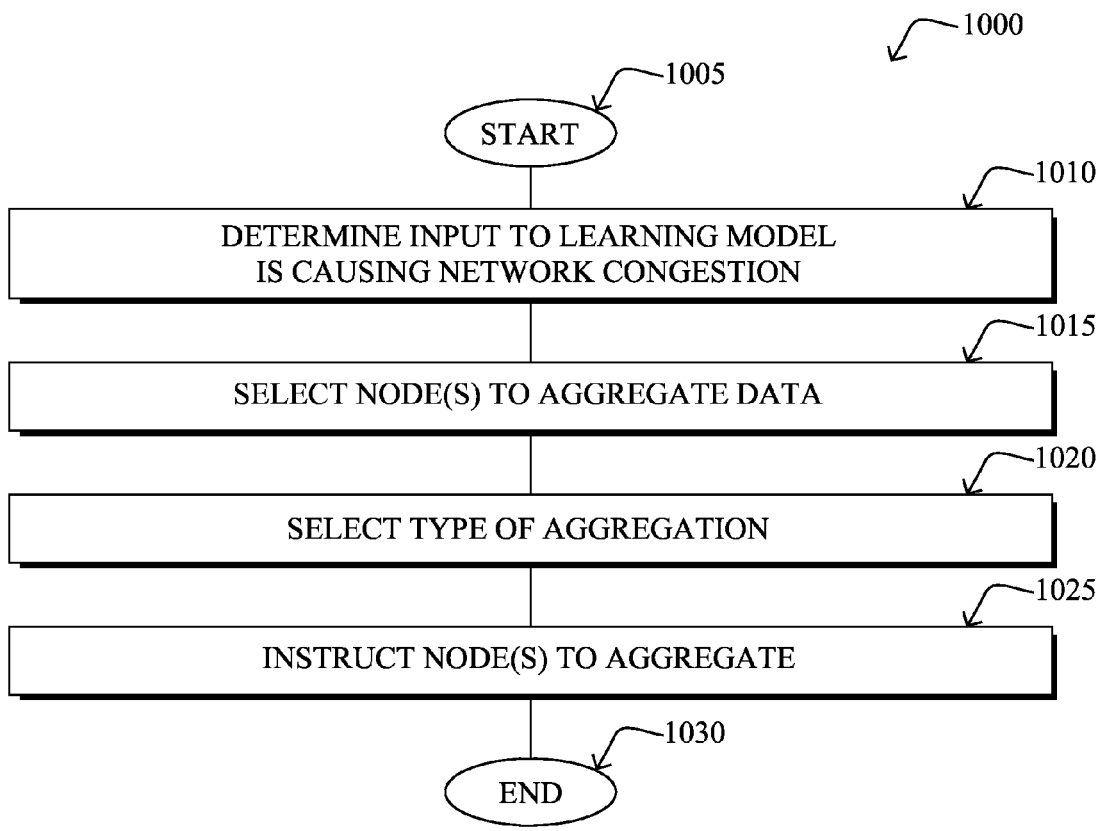
FIG. 10 illustrates an example simplified procedure for aggregating collected feature data in a network.

FIG. 10 illustrates an example simplified procedure for aggregating collected feature data in a network. Procedure 1000 begins at step 1005 and continues on to step 1010 where, as detailed above, it is determined that the input to a learning machine model is causing network congestion. In step 1015, one or more nodes are selected to aggregate the feature data being sent. As described in greater detail above, aggregation nodes may be selected based on the routing topology, link layer information (e.g., using the available bandwidth data contained in this information), the traffic matrix, the nodes' attributes (e.g., obtained from node metrics), combinations thereof, or the like. In step 1020, a type of aggregation is also selected for each of the one or more nodes selected in step 1015. For example, as detailed above, an aggregation node may be selected to average or sample feature data that it receives from one or more source nodes, or perform another type of aggregation. Also as detailed above, the features to be aggregated may also be selected (e.g., based on the importance of the features to the model, etc.), in some embodiments. In step 1025, an instruction is sent to the one or more nodes selected to perform the selected type of aggregation on the feature data. Such an instruction, as detailed above, may include information regarding the type of aggregation to be performed, which features are to be aggregated, or any other information to facilitate the control over a potential aggregator. Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Illustratively, each of the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

The techniques described herein, therefore, provide for the dynamic aggregation of feature data used by a machine learning model in a network. The techniques provide for mechanisms whereby the devices that aggregate the data and/or the types of aggregation performed are dynamically selected. Thus, the techniques herein allow for the dynamic control over the feature data aggregation so as to reduce the number of collisions and maintain the performance of the machine learning model.

While there have been shown and described illustrative embodiments that provide for computer network anomaly training and detection using artificial neural networks, generally, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining, by a device, that feature messages being sent as input data to a machine learning model from a plurality of source nodes to an aggregation node are causing network congestion, wherein the feature messages are messages sent by the plurality of source nodes to the device, the messages including features relevant to the machine learning model; and in response to determining that the feature messages are causing network congestion:

selecting, by the device, a set of one or more other nodes to perform aggregation of the machine learning model input data, selecting, by the device, a type of aggregation to be performed by the set of one or more other nodes, and instructing, by the device, the set of one or more other nodes to perform the selected type of aggregation on the data sent from the source nodes.

2. The method as in claim 1, wherein the machine learning model is an artificial neural network (ANN).

3. The method as in claim 1, wherein the network congestion is determined by the device based on an estimated traffic rate from the source nodes.

4. The method as in claim 1, wherein the network congestion is determined by the device based on a performance metric for the machine learning model.

5. The method as in claim 1, wherein the type of aggregation is selected from the group comprising: averaging consecutive samples of input data, sampling the input data, batching the input data, quantizing the input data, and applying a differential encoding to the input data.

6. The method as in claim 1, wherein the network congestion is determined by the device based on a notification received from a node that a number of non-acknowledged transmissions from the node exceeds a threshold value.

7. The method as in claim 1, wherein the network congestion is determined by the device based on a notification received from a node that a percentage of link bandwidth attributable to communication of the input data exceeds a threshold value.

8. The method as in claim 1, wherein the one or more nodes selected to perform the aggregation are based on data selected from a group comprising: routing topology information, available bandwidth, and network usage of the selected nodes.

9. The method as in claim 1, wherein the one or more nodes and the aggregation type are selected to reduce an amount of network traffic associated with the input data to the machine learning model.

10. The method as in claim 1, wherein the steps of claim 1 are repeated as part of a closed-loop control mechanism.

11. An apparatus, comprising: one or more network interfaces to communicate in a computer network;

a processor coupled to the network interfaces and configured to execute one or more processes; and a memory configured to store a process executable by the processor, the process when executed operable to:

determine that feature messages being sent as input data to a machine learning model from a plurality of source nodes to an aggregation node are causing network congestion, wherein the feature messages are messages sent by the plurality of source nodes to the aggregation node, the messages including features relevant to the machine learning model; and in response to a determination that the feature messages are causing network congestion:

select a set of one or more other nodes to perform aggregation of the machine learning model input data, select a type of aggregation to be performed by the set of one or more other nodes, and instruct the set of one or more other nodes to perform the selected type of aggregation on the data sent from the source nodes.

12. The apparatus as in claim 11, wherein set of one or more other nodes are selected based in part on a determination that the input data is overloading the machine learning model.

13. The apparatus as in claim 11, wherein the type of aggregation is selected from the group comprising: averaging consecutive samples of input data, sampling the input data, batching the input data, quantizing the input data, and applying a differential encoding to the input data.

14. The apparatus as in claim 11, wherein the one or more nodes selected to perform the aggregation are based on data selected from a group comprising: routing topology information, available bandwidth, and network usage of the selected nodes.

15. The apparatus as in claim 11, wherein the one or more nodes and the aggregation type are selected to reduce an amount of network traffic associated with the input data to the machine learning model.

16. The apparatus as in claim 11, wherein the network congestion is determined by the device based on a notification received from a node that a number of non-acknowledged transmissions from the node exceeds a threshold value.

17. The apparatus as in claim 11, wherein the network congestion is determined by the device based on a notification received from a node that a percentage of link bandwidth attributable to communication of the input data exceeds a threshold value.

18. A tangible, non-transitory; computer-readable media having software encoded thereon, the software when executed by a processor operable to:

determine that feature messages being sent as input data to a machine learning model from a plurality of source nodes to an aggregation node are causing network congestion, wherein the feature messages are messages sent by the plurality of source nodes to the aggregation node, the messages including features relevant to the machine learning model; and in response to a determination that the feature messages are causing network congestion:

select a set of one or more other nodes to perform aggregation of the machine learning model input data based on feature relevance to the machine learning model, select a type of aggregation to be performed by the set of one or more other nodes, and instruct the set of one or more other nodes to perform the selected type of aggregation on the data sent from the source nodes.

19. The computer-readable media of claim 18, wherein the machine learning model is an artificial neural network (ANN).

20. The computer-readable media of claim 18, wherein the type of aggregation is selected from the group comprising: averaging consecutive samples of input data, sampling the input data, batching the input data, quantizing the input data, and applying a differential encoding to the input data.

* * * * *